US007577102B2

(12) United States Patent
Fujimoto et al.

(10) Patent No.: US 7,577,102 B2
(45) Date of Patent: Aug. 18, 2009

(54) INFORMATION PROCESSING SYSTEM, INFORMATION PROCESSING METHOD, AND COMPUTER READABLE MEDIUM

(75) Inventors: Masakazu Fujimoto, Kanagawa (JP);
Keiichi Nemoto, Kanagawa (JP);
Masamichi Takahashi, Kanagawa (JP);
Nobuhiro Yamasaki, Kanagawa (JP);
Takashi Sonoda, Kanagawa (JP);
Noriyuki Kurabayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 682 days.

(21) Appl. No.: 11/131,353

(22) Filed: May 18, 2005

(65) Prior Publication Data

US 2006/0092954 A1 May 4, 2006

(30) Foreign Application Priority Data

Oct. 15, 2004 (JP) ............................ P2004-302008

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)

(52) U.S. Cl. ...................................... 370/252; 370/254
(58) Field of Classification Search ................. 370/338, 370/254, 255, 241, 242, 245, 250, 252; 709/238
See application file for complete search history.

(56) References Cited

U.S. PATENT DOCUMENTS

| 5,014,262 | A  | * | 5/1991  | Harshavardhana ........... 370/237 |
| 5,933,416 | A  | * | 8/1999  | Schenkel et al. ............. 370/254 |
| 6,141,552 | A  | * | 10/2000 | Sendonaris et al. .......... 455/436 |
| 6,209,033 | B1 | * | 3/2001  | Datta et al. .................. 709/224 |
| 7,016,313 | B1 | * | 3/2006  | Harper ........................ 370/254 |
| 7,120,680 | B1 | * | 10/2006 | Higgins et al. .............. 709/220 |
| 7,174,387 | B1 | * | 2/2007  | Shand et al. ................ 709/238 |
| 7,239,606 | B2 | * | 7/2007  | Gilmour et al. ............. 370/222 |
| 2002/0196745 | A1 | * | 12/2002 | Frouin et al. ................ 370/254 |
| 2003/0016678 | A1 | * | 1/2003  | Maeno ........................ 370/400 |
| 2003/0198213 | A1 | * | 10/2003 | Jensen et al. ................ 370/351 |
| 2004/0004939 | A1 | * | 1/2004  | Yegenoglu ................... 370/252 |
| 2004/0170151 | A1 | * | 9/2004  | Habetha ...................... 370/338 |
| 2004/0213233 | A1 | * | 10/2004 | Hong et al. .................. 370/392 |

(Continued)

FOREIGN PATENT DOCUMENTS

| JP | 2003-271666 A | 9/2003 |
| JP | 2003-271667 A | 9/2003 |

*Primary Examiner*—Edan Orgad
*Assistant Examiner*—Hoang-Chuong Q Vu
(74) *Attorney, Agent, or Firm*—Sughrue Mion, PLLC

(57) ABSTRACT

An information processing system has a link information input unit, a link information totaling unit and a network similarity calculating unit. The link information input unit inputs link information indicating links among nodes in networks. The link information totaling unit totals the link information in the respective networks to be compared and determines presence/absence of the links among the nodes or link quantities. The network similarity calculating unit calculates the similarity among the networks based on the sum of the comparison results of the links among all nodes.

12 Claims, 22 Drawing Sheets

U.S. PATENT DOCUMENTS

2005/0047350 A1* 3/2005 Kantor et al. ............... 370/254
2005/0096958 A1* 5/2005 Rice et al. ...................... 705/8
2005/0111375 A1* 5/2005 Ravindran et al. .......... 370/252
2005/0169179 A1* 8/2005 Antal et al. ................. 370/231

* cited by examiner

FIG. 19

| | 1 | 2 | 3 | 4 | 5 |
|---|---|---|---|---|---|
| 1 | | 1 | | 1 | 1 |
| 2 | | | 1 | | 2 |
| 3 | | 3 | | | 1 |
| 4 | 1 | | 1 | | |
| 5 | 1 | 1 | | | |

ID1-ID5
ID2-ID3
ID1-ID4
ID3-ID5
ID1-ID2
ID2-ID5
ID5-ID1
ID4-ID3
ID3-ID2
ID2-ID5
ID4-ID1
ID3-ID2
ID5-ID2
ID3-ID2

INFORMATION PROCESSING SYSTEM, INFORMATION PROCESSING METHOD, AND COMPUTER READABLE MEDIUM

BACKGROUND OF THE INVENTION

1. Field of the Invention

The present invention relates to an information processing system, that evaluates a network in which an interrelationship of all works required for accomplishing any project are schematized, an information processing method, and a computer program. Particularly, the present invention relates to an information processing system that evaluates a network having fixed nodes, such as a communication network, a traffic flow, a group sharing link network, which changes in a time manner or by any operation, an information processing method, and a computer program.

2. Description of the Related Art

A man is by nature a social animal, constructs various forms of organizations, irregardless of profit or nonprofit, and leads various political, social, and industrial activities. These activities are constructed by an interrelationship of plural works. For example, the interrelationship of all works required for accomplishing any project is schematized in a form of a so-called 'network'. The network described herein includes a communication network, a traffic flow, a group sharing link network, and the like, and has a plurality of nodes and links connecting associated nodes.

Here, in order to accomplish efficient organization activities or new organization enhancement, it is necessary to evaluate a networked organization. The nodes of an organization network are fixed elements such as members of the organization, while the structure of the network (or the link relationship of the nodes) changes in a time manner or by any operation. When the change in the network structure or network flow is evaluated, generally, the network structure is schematized by handwork or by using chart creating software. Then, a difference among the network structures to be compared is observed or it is compared to the network analysis index.

For example, it has been suggested an inter-tree structure distance calculation technique in which quantitative similarity among graphs of tree structures, each having a root and an order, can be determined (for example, see JP-A-2003-271666 and JP-A-2003-271667). However, in this evaluation method, there is no limitation with respect to a node, while it does not correspond to the network structure. When a network structure cannot be expressed only with the tree structure, such as a graph including a loop therein, it cannot be indexed. For example, when there are three network patterns of A, B, and C (for example, see FIG. 26), it is not easy to clarify that either B or C approximate to A.

Further, when a general network analysis index is used, if topologies are matched with each other, it is judged that the similarity exists. Accordingly, it does not correspond to the fixed nodes. That is, it is impossible to evaluate a network having the fixed nodes which changes in the time manner or by any operation.

SUMMARY OF THE INVENTION

The invention provides a superior information processing system that can properly evaluate a network in which an interrelationship of all works required for accomplishing any project is schematized, an information processing method, and a computer program.

According to an aspect of the invention, the present invention provides a superior information processing system that can properly evaluate a network having fixed nodes, such as a communication network, a traffic flow, a group sharing link network, or the like, that changes in a time manner or by any operation, an information processing method, and a computer program.

According to another aspect of the present invention, the present invention provides a superior information processing system that can define the degrees of accordance among networks as similarity, under a condition that nodes are fixed, and determine an approximation of a structure of a network accordingly, an information processing method, and a computer program.

BRIEF DESCRIPTION OF THE DRAWINGS

FIG. 19 is a diagram showing a case in which link information is totaled when the links do not have directionality.

DESCRIPTION OF THE EMBODIMENTS

Hereinafter, the embodiment of the invention will be described with reference to the drawings.

An interrelationship of all works required for accomplishing any project is schematized in a form of a so-called 'network'. The network described herein includes a communication network, a traffic flow, a group sharing link network, or the like. The network has a plurality of nodes and links connecting associated nodes. The link represents the degree of coupling between the nodes. For example, the link corresponds to presence/absence of a relationship of the nodes, a frequency or the number of times having the relationship (for example, a frequency or the number of times of mail transmission and reception).

When activity statuses of an organization and the like are evaluated, it is necessary to compare and analyze a network structure of the organization. For example, in order to see the time lapse change of the network structure in any organization, the similarity among the networks before and after in the time manner is calculated. Alternatively, the similarity among the network structures in the organizations to be compared is calculated.

Figure 1:
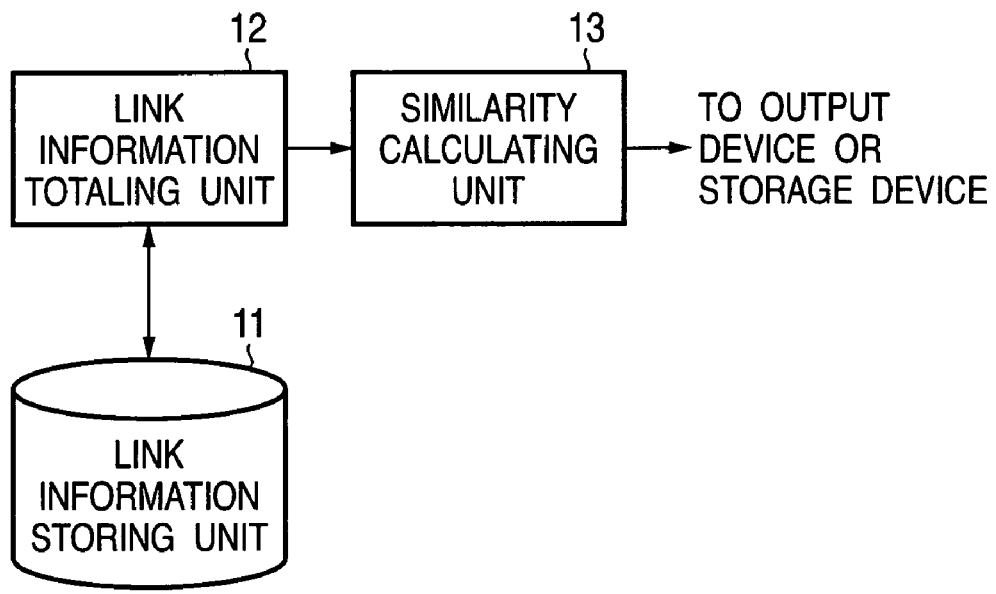
FIG. 1 is a diagram schematically showing a functional configuration of an information processing system 10 which calculates similarity among network structures.

FIG. 1 schematically shows a functional configuration of an information processing system 10 which calculates the similarity among the network structures. The information processing system 10 is actually implemented in such a form that a predetermined application is executed on a general computer system, such as a personal computer.

A link information storing unit 11 stores information indicating the links among the nodes. In the present embodiment, there is a limitation that the nodes are fixed. In a case in which the group sharing link network is processed, the respective nodes correspond to, for example, members of an organization and are represented by member IDs. Further, the link or link quantity represents the degree of coupling between the nodes. Specifically, the link is represented by presence/absence of communications, such as mails, among the members corresponding to the nodes or the number of times. Further, the link may have directionality, such that the communication can be made by any one of the nodes.

A link information totaling unit 12 totals the information regarding the links among the nodes and determines the presence/absence of the links among the nodes or the link quantities. For example, when messages of mails or logs of communications interchanged within the organization are handled as the link information, the link information totaling unit 12 totals the number of times of the messages interchanged among the members corresponding to the nodes.

A similarity calculating unit 13 calculates the degrees of similarity among a plurality of networks by using the presence/absence of the links among the nodes or the link quantities and outputs or stores the results.

For example, the similarity calculating unit 13 determines the degree of accordance of the presence/absence of the links among all nodes constituting the network. The number of all nodes constituting the network V is n, an ID of a source node of a message is i (where $1 \leq i \leq n$), and an ID of a destination node is j (where $1 \leq j \leq n$). Here, when a link between the nodes i and j exists, a variable $x_{ij}$ is 1 and, when a link between the nodes i and j does not exist, a variable $x_{ij}$ is 0. In this case, when the presence/absence of the link accords with that of a corresponding link $x_{ij}'$ of a network V' to be compared to the network V, the degree of accordance of the corresponding link is set to 1. Otherwise, the degree of accordance of the corresponding link is set to 0. Then, the number of possible links are determined based on the numbers of the nodes n included in the network V and the network V'. Subsequently, the sum of the comparison results of accordance and discordance in all nodes is divided by the number of the possible links. As a result, the degrees of accordance s of the presence/absence of the links among all nodes are quantitatively expressed.

The degree of accordance of the presence/absence of the link between the node i and the node j is expressed by $(1-|x_{ij}-x_{ij}'|)$. Further, the number of the possible links in the network V is expressed by a combination $_nC_2$ when the directionality of the link is not considered, while it is expressed by a permutation $_nP_2$ when the directionality of the link is considered. Therefore, when the directionality is not considered and when the directionality is considered, the degrees of accordance s of the presence/absence of the links in all nodes between the network V and the network V' can be determined by the following equations, respectively.

$$s = \frac{\sum_{i=1}^{n-1} \sum_{j=i+1}^{n} (1 - |x_{ij} - x_{ij}'|)}{_nC_2} \quad \text{[Equation 1]}$$

$$s = \frac{\sum_{i=1}^{n} \sum_{j \neq i} (1 - |x_{ij} - x_{ij}'|)}{_nP_2} \quad \text{[Equation 2]}$$

Figure 2:
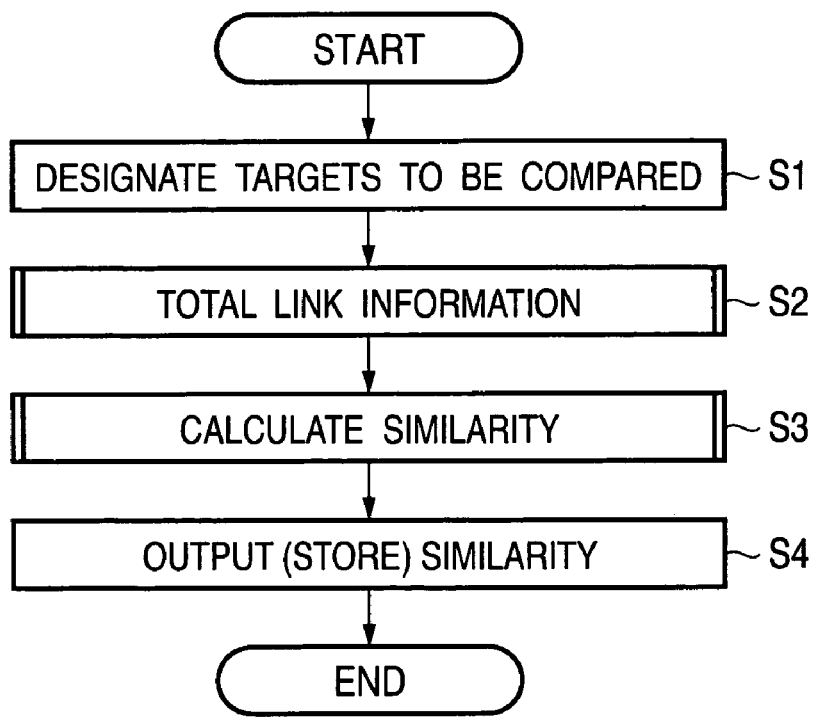
FIG. 2 is a flowchart showing a process which calculates the similarity among the network structures in the system configuration shown in FIG. 1.

FIG. 2 is a flowchart showing a process which calculates the similarity among the network structures in the system configuration shown in FIG. 1.

First, the network V and the network V' to be compared are designated (Step S1). The targets to be compared are network structures which are formed at different time in the same organization or network structures which are formed in different organizations from one another to be compared.

Then, the corresponding link information with respect to the networks to be compared are extracted from the link information storing unit 11 and the presence/absence of the links among the nodes or the link quantities is totaled (Step S2).

Next, based on the totaling result of the link information, the degrees of accordance of the presence/absence of the links among all nodes are calculated by using the above-described equations (Step S3) and the results are outputted or stored as the degrees of similarity among the plurality of networks (Step S4).

Figure 3:
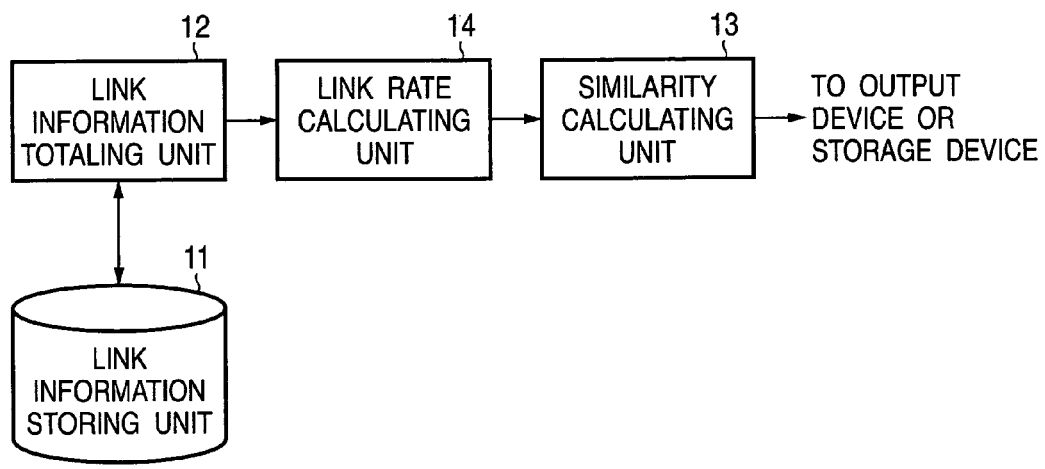
FIG. 3 is a diagram schematically showing another functional configuration of the information processing system 10 that calculates the similarity among the network structures.

Further, FIG. 3 schematically shows a functional configuration of an information processing system 10 which calculates the similarity among the network structures. The information processing system 10 is actually implemented in such a form that the predetermined application is executed on the general computer system, such as the personal computer.

In the configuration shown in FIG. 1, only the presence/absence of the links among the nodes is handled with a binary of 0 and 1. In the configuration shown in FIG. 3, however, link quantities among the nodes are handled. The link quantity corresponds to, for example, a mail flow (or the traffic) between the nodes. In this case, the link quantities among the nodes are converted into the rates with respect to the maximum value to be normalized, such that the measure of the similarity among the networks is uniform, irregardless of the mail flow of the entire network.

A link information storing unit 11 stores information indicating the links among the nodes. In the present embodiment, there is a limitation that the nodes are fixed. In a case in which the group sharing link network is processed, the respective nodes correspond to, for example, members of an organization and are represented by member IDs. Further, the link or link quantity represents the degree of coupling between the nodes. Specifically, the link is represented by the presence/absence of communications, such as mails, among the members corresponding to the nodes or the number of times. Further, the link may have directionality, such that the communication can be made by any one of the nodes.

A link information totaling unit 12 totals the link information regarding the links among the nodes and determines presence/absence of the links among the nodes or the link quantities. For example, when messages of mails or logs of communications interchanged within the organization are handled as the link information, the link information totaling unit 12 totals the number of times of the messages interchanged among the members corresponding to the nodes.

A link rate calculating unit 14 converts the link quantities among the nodes into the rates with respect to the maximum value, such that the measure of the similarity among the networks is uniform, irregardless of the link flow in the entire network.

A similarity calculating unit 13 calculates the degrees of similarity among a plurality of networks by using the presence/absence of the links among the nodes or the link quantities and outputs or stores the results.

The number of all nodes constituting a network V is n, an ID of a source node of a message is i (where $1 \leq i \leq n$), and an ID of a destination node is j (where $1 \leq j \leq n$). Here, the link quantity (for example, mail flow) between the nodes i and j is stored in a variable $v_{ij}$. Then, a value which is obtained by dividing the link quantity $v_{ij}$ by the maximum link quantity is set to the link rate $x_{ij}$ between the nodes i and j. Then, the number of the possible links are determined based on the numbers of the nodes n included in the networks V and V'. Subsequently, the sum of the comparison results of the link rates in all nodes is divided by the number of the possible links. As a result, the degrees of accordance s of the link rates among all nodes are quantitatively expressed.

The degree of accordance of the link rate for each link is expressed by $(1-|x_{ij}-x_{ij}'|)$. Further, the number of the possible links in the network V is expressed by the combination $_nC_2$ when the directionality of the link is not considered, while it is expressed by the permutation $_nP_2$ when the directionality of the link is considered. Therefore, in a case in which the network V and the network V' are compared to each other, when the directionality is not considered and when the directionality is considered, the degrees of accordance s of the presence/absence of the links among all nodes can be determined by the following equations, respectively.

$$s = \frac{\sum_{i=1}^{n-1} \sum_{j=i+1}^{n} (1 - |x_{ij} - x_{ij}'|)}{_nC_2}$$ [Equation 3]

$$s = \frac{\sum_{i=1}^{n} \sum_{j \neq i} (1 - |x_{ij} - x_{ij}'|)}{_nP_2}$$ [Equation 4]

When the link rate of each node is calculated by the link rate calculating unit 14 and when the comparison of the link quantities between the network V and the network V' to be compared is required, the rates with respect to the maximum link quantity of both the network V and the network V' are taken. In this case, the link rates $x_{ij}$ and $x_{ij}'$ between the nodes i and j are expressed by the following equation.

$$x_{ij} = \frac{v_{ij}}{\max(v \in V, v' \in V')}$$ [Equation 5]

$$x_{ij}' = \frac{v_{ij}'}{\max(v \in V, v' \in V')}$$

Further, when the relative rates of the link quantities in the network V and the network V' are required, the rates with respect to the maximum link quantity in the network V and V' are respectively taken. In this case, the link rates $x_{ij}$ and $x_{ij}'$ between the nodes i and j are expressed by the following equation.

$$x_{ij} = \frac{v_{ij}}{\max(v \in V)}$$ [Equation 6]

$$x_{ij}' = \frac{v_{ij}'}{\max(v' \in V')}$$

Figure 4:
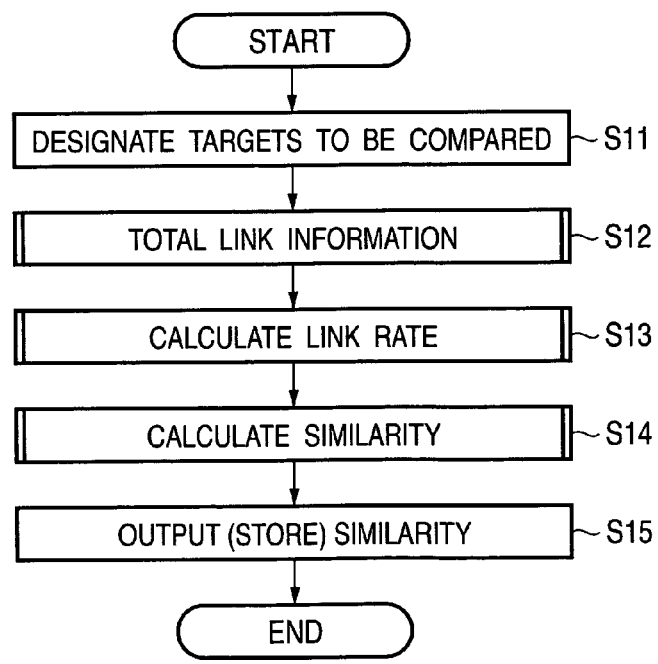
FIG. 4 is a flowchart showing a process which calculates the similarity among the network structures in the system configuration shown in FIG. 3.

FIG. 4 is a flowchart showing a process which calculates the similarity among the networks in the system configuration shown in FIG. 3.

First, the network V and the network V' to be compared are designated (Step S11). The targets to be compared are network structures which are formed at different time in the same organization or network structures which are formed in different organizations from one another to be compared.

Then, the corresponding link information with respect to the networks to be compared is extracted from the link information storing unit 11 and the presence/absence of the links among the nodes or the link quantities are totaled (Step S12).

Next, the link rate calculating unit 14 converts the link quantities among the nodes into the rates with respect to the maximum value based on the totaling result of the link information (Step S13).

Next, the similarity calculating unit 13 calculates the degrees of accordance of the link rates among all nodes by using the above-described equation (Step S14) and outputs or stores the results as the degrees of similarity among the plurality of networks (Step S15).

Figure 5:
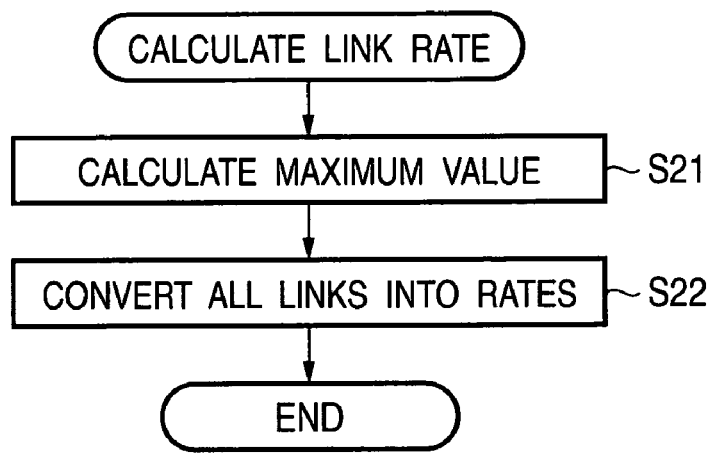
FIG. 5 is a flowchart showing a process which calculates a link rate.

Further, FIG. 5 is a flowchart showing a process which calculates the link rates in the step S13.

First, the maximum link quantity is calculated (Step S21). When the comparison of the link quantities between the network V and the network V' to be compared is required, the rates with respect to the maximum link quantity of both the network V and the network V' are taken. Further, when the relative rates of the link quantities in the network V and the network V' are required, the rates with respect to the maximum link quantities in the network V and the network V' are respectively taken.

Next, the value obtained by dividing the link quantity $v_{ij}$ between the nodes i and j by the maximum link quantity is set to the link rate $x_{ij}$ between the nodes i and j (Step S22).

In accordance with the system configuration shown in FIG. 1 or 3, in the network V and the network V' designated as the targets to be compared, the degrees of accordance s of the presence/absence of the links among all nodes or the link quantities (the link rates) are calculated, such that the similarity between the networks can be quantitatively expressed.

By the way, in an actual organization, since an event such as a personnel change, an entering a company, a retirement from a company, or the like occurs, it is likely to increase or decrease the nodes constituting the network. In this case, even though the network V and the network V' to be compared are the network structures that are formed at the different time in the same organization, the correspondence relationship of the nodes is lost, and thus the calculation of the similarity is difficult or complex.

Figure 6:
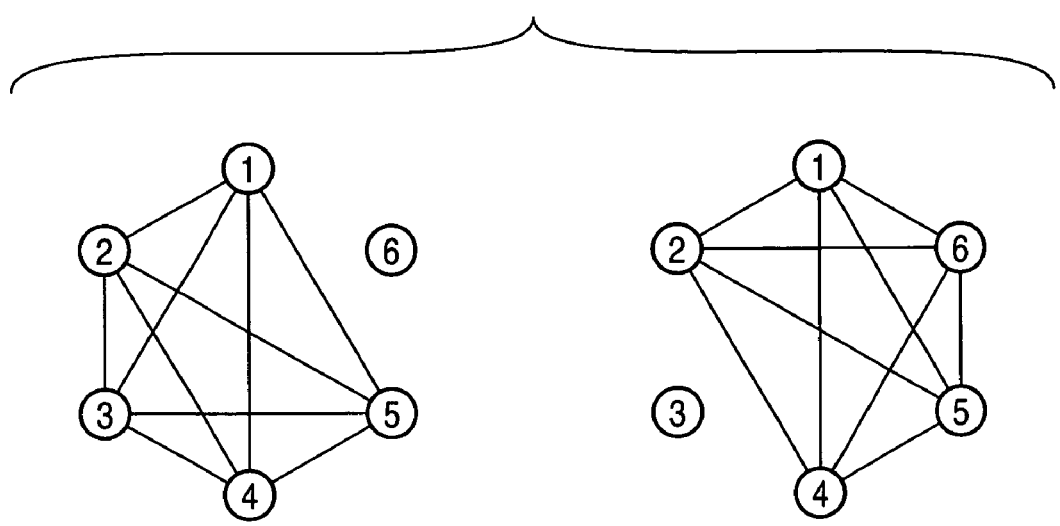
FIG. 6 is a diagram schematically showing a case in which dummies of deficient nodes are added to the respective networks to maintain correspondence relationship of nodes among the networks, such that the nodes are made to be equal.

Then, as shown in FIG. 6, dummies of deficient nodes are added to the respective networks, such that the nodes are made to be equal between the network V and the network V' to be compared. Thus, the correspondence relationship of the nodes between the networks may be maintained. In the example shown in FIG. 6, to the network structure on the left side, the deficient node 6 is added. Further, to the network structure on the right side, the deficient node 3 is added.

Figure 7:
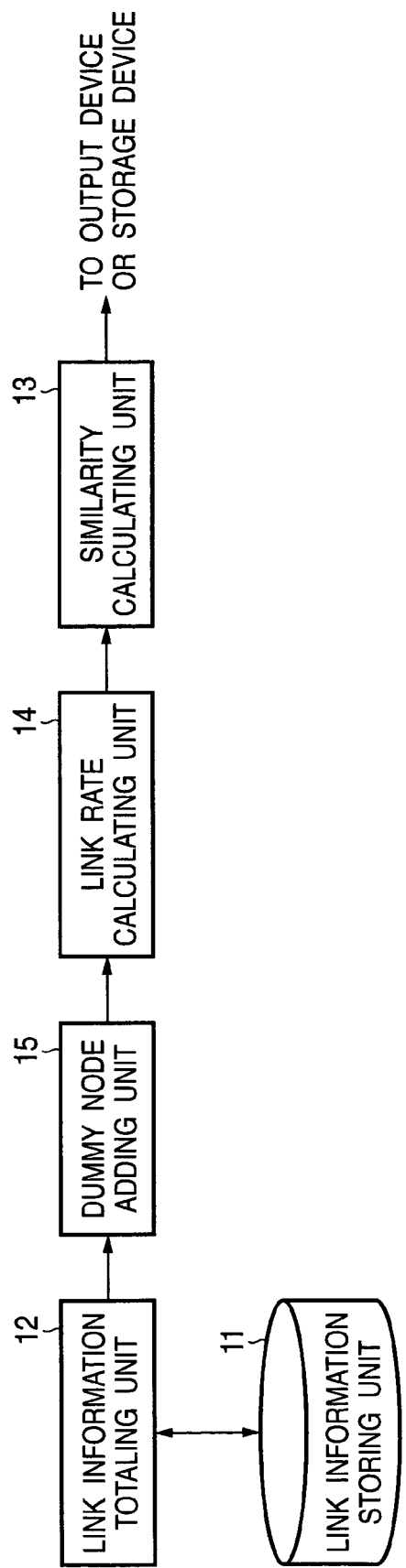
FIG. 7 is a diagram schematically showing still another functional configuration of the information processing system 10 that calculates the similarity among the network structures.

FIG. 7 shows an example of a system configuration which has a function of adding dummy nodes to the network structures.

A link information storing unit 11 stores information indicating the links among the nodes. In the present embodiment, there is a limitation that the nodes are fixed. In a case in which the group sharing link network is processed, the respective nodes correspond to, for example, members of an organization and are represented by member IDs. Further, the link or link quantity represents the degree of coupling between the nodes. Specifically, the link is represented by the presence/absence of communications, such as mails, among the members corresponding to the nodes or the number of times. Further, the link may have directionality, such that the communication can be made by any one of the nodes.

A link information totaling unit 12 totals the link information regarding the links among the nodes and determines the presence/absence of the links among the nodes or the link quantities. For example, when messages of mails or logs of communications interchanged within the organization are handled as the link information, the link information totaling unit 12 totals the number of times of the messages interchanged among the members corresponding to the nodes.

A dummy node adding unit 15 adds a dummy node not having the links with other nodes, when a corresponding node does not exist in any one of the network V and the network V' to be compared, so as to reduce or add the nodes, such that the correspondence relationship of the network V and the network V' is formed.

A link rate calculating unit 14 converts the link quantities among the nodes into the rates with respect to the maximum value, such that the measure of the similarity among the networks is uniform, irregardless of the link flow in the entire network. When the link rate of each node is calculated and when the comparison of the link quantities between the network V and the network V' to be compared is required, the rates with respect to the maximum link quantity of both the network V and the network V' are taken. Further, when the relative rates of the link quantities in the network V and the network V' are required, the rates with respect to the maximum link quantities in the network V and the network V' are respectively taken.

A similarity calculating unit 13 calculates the degrees of similarity among a plurality of networks by using the presence/absence of the links among the nodes or the link quantities and outputs or stores the results.

The number of all nodes, including the dummy nodes, constituting a network V is n, an ID of a source node of a message is i (where $1 \leq i \leq n$), and an ID of a destination node is j (where $1 \leq j \leq n$). Here, the link quantity (for example, mail flow) between the nodes i and j is stored in a variable $v_{ij}$. Then, a value which is obtained by dividing the link quantity $v_{ij}$ by the maximum link quantity is set to the link rate $x_{ij}$ between the nodes i and j. Then, the number of the possible links are determined based on the numbers of the nodes n included in the networks V and V'. Subsequently, the sum of the comparison results of the link rates in all nodes is divided by the number of the possible links. As a result, the degrees of accordance s of the link rates among all nodes are quantitatively expressed.

The degree of accordance of the link rate for each link is expressed by $(1-|x_{ij}-x_{ij}'|)$. Further, the number of the possible links in the network V is expressed by the combination $_nC_2$ when the directionality of the link is not considered, while it is expressed by the permutation $_nP_2$ when the directionality of the link is considered (the same relation).

Figure 8:
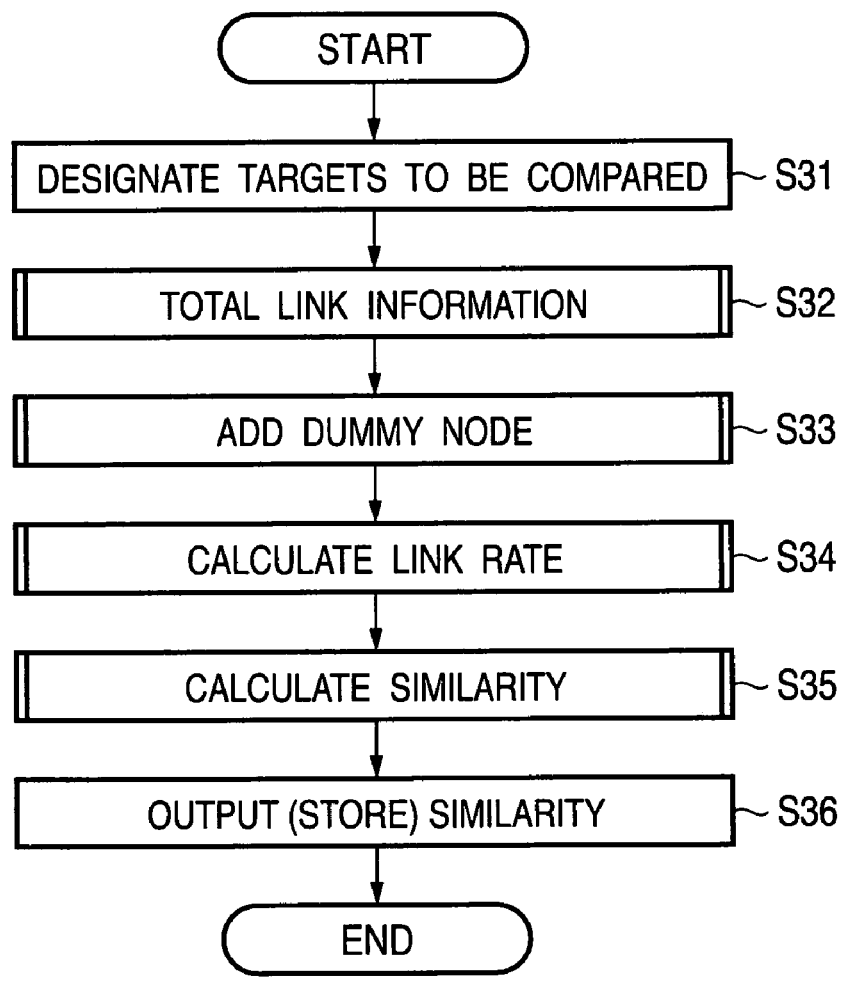
FIG. 8 is a flowchart showing a process which calculates the similarity among the network structures in the system configuration shown in FIG. 7.

FIG. 8 is a flowchart showing a process which calculates the similarity among the networks in the system configuration shown in FIG. 7.

First, the network V and the network V' to be compared are designated (Step S31). The targets to be compared are network structures which are formed at different time in the same organization or network structures which are formed in different organizations from one another to be compared.

Then, the corresponding link information with respect to the networks to be compared are extracted from the link information storing unit 11 and the presence/absence of the links among the nodes or the link quantities are totaled (Step S32).

Next, the dummy node adding unit 15 adds the dummy node not having the links with other nodes, when the corresponding node does not exist in any one of the network V and the network V' to be compared, so as to reduce or add the nodes and forms the correspondence relationship of the nodes in the network V and the network V' (Step S33).

Next, the link rate calculating unit 14 converts the link quantities among the nodes into the rates with respect to the maximum value based on the totaling result of the link information (Step S34).

Next, the similarity calculating unit 13 calculates the degrees of accordance of the link rates among all nodes by using the above-described equation (Step S35) and outputs or stores the results as the degrees of similarity among the plurality of networks (Step S36).

Figure 9:
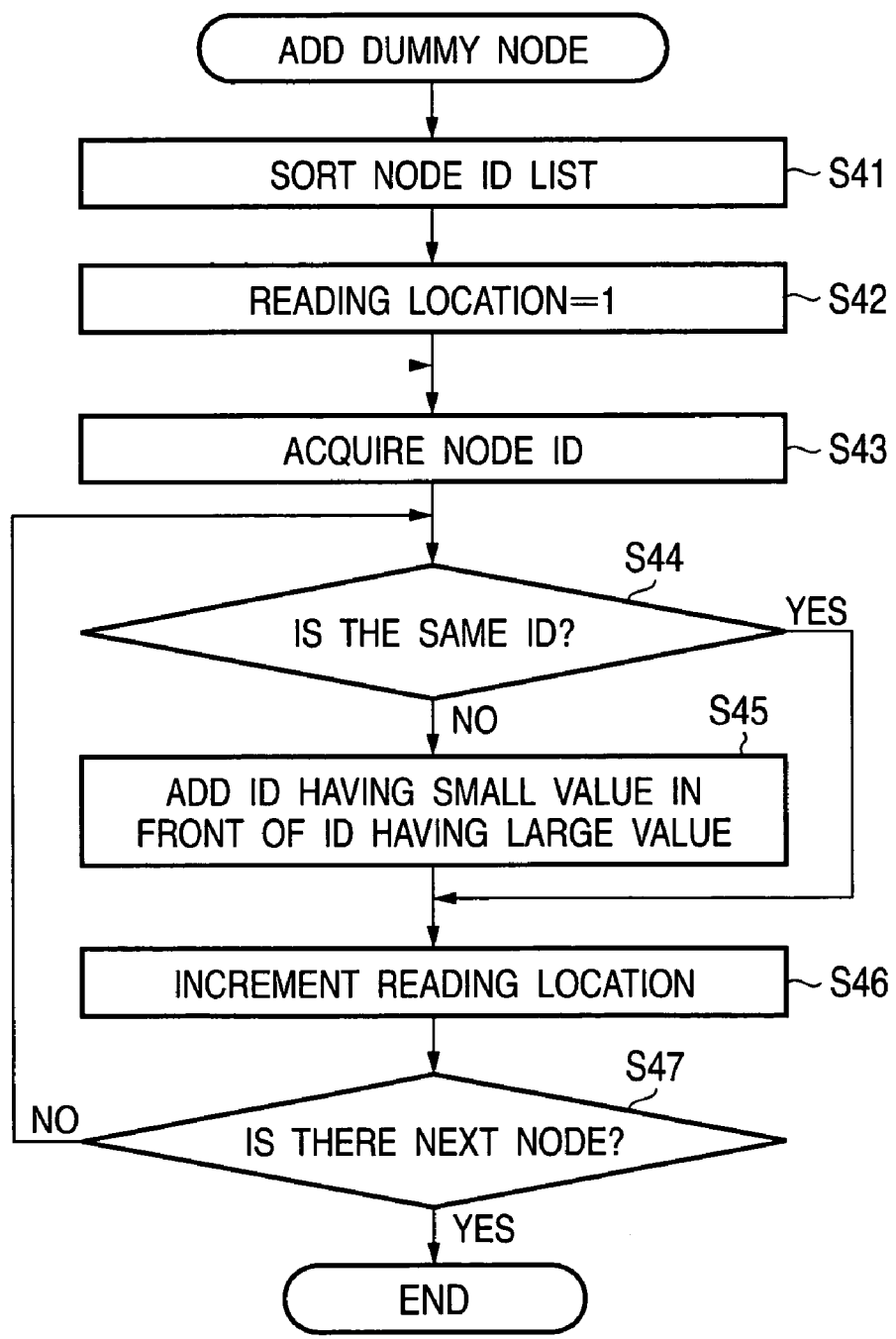
FIG. 9 is a flowchart showing a process which adds dummy nodes.

Further, FIG. 9 is a flowchart of a dummy node adding process in the step S33 which adds the deficient nodes in any one of the networks to be compared as the dummies.

First, in the respective networks V and V' to be compared, a list of the node IDs is sorted (Step S41). Then, a reading location of the list is set to 1, that is, a head and, subsequently, the process that detects the deficient nodes and adds the dummy nodes are repeatedly executed.

The node IDs are acquired from the reading location of the node ID list of the respective networks V and V' to be compared (Step S42) and the acquired node IDs are compared to judge whether or not they accord with each other (Step S43).

Here, when the node IDs do not accord with each other, in the network having a node ID of a large value, a node having a node ID of a small value lacks, such that the deficient node is added to the network as the dummy (Step S44).

Then, the reading location of the node ID is incremented by 1 (Step S45). When there is the next node in the node ID list (Step S46), the process progresses to the step S43 and the addition process of the dummy node which is in the same status as an actual condition is repeatedly executed.

In the embodiment of the invention, under the condition that the nodes are fixed, the similarity among the network structures can be calculated based on the sum of the comparison results of the links among all nodes. When the link between the nodes has or does not have the directionality and when only the presence/absence of the links between the nodes or the link quantities is handled, the calculation method of the similarity between the networks are broadly divided. Hereinafter, the operation of the process which calculates the similarity between the networks will be described in detail.

Figure 10:
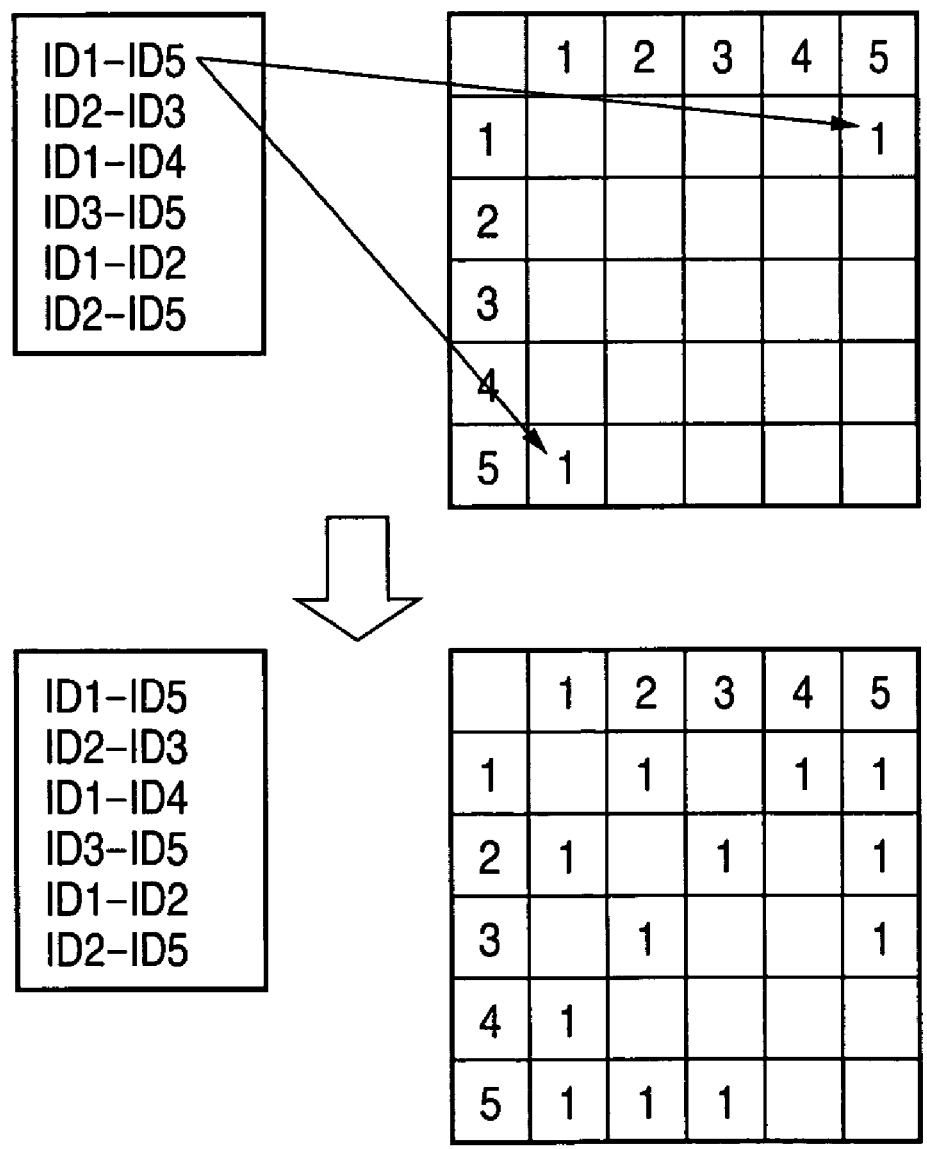
FIG. 10 is a diagram showing a case which totals link information when links do not have directionality.

(1) When the Link does not have the Directionality and the Presence/Absence of the Links are Compared FIG. 10 shows a case where totals the link information when the link does not have the directionality. The link information is constituted by the communication log in the organization, for example. In this case, only the presence/absence of the links among the nodes is totaled and a source (Sender) and a destination (Receiver) of a message are not divided. For example, with respect to the communication log of ID1-ID5, in a link information totaling table in which a row and a column are constructed for each node, 1 which indicates that the link exists is written into both ID1-ID5 and ID5-ID1. This is because, when the target to be compared is a valid link, the comparison is performed bi-directionally. If not necessary, only one direction may be marked.

Figure 11:
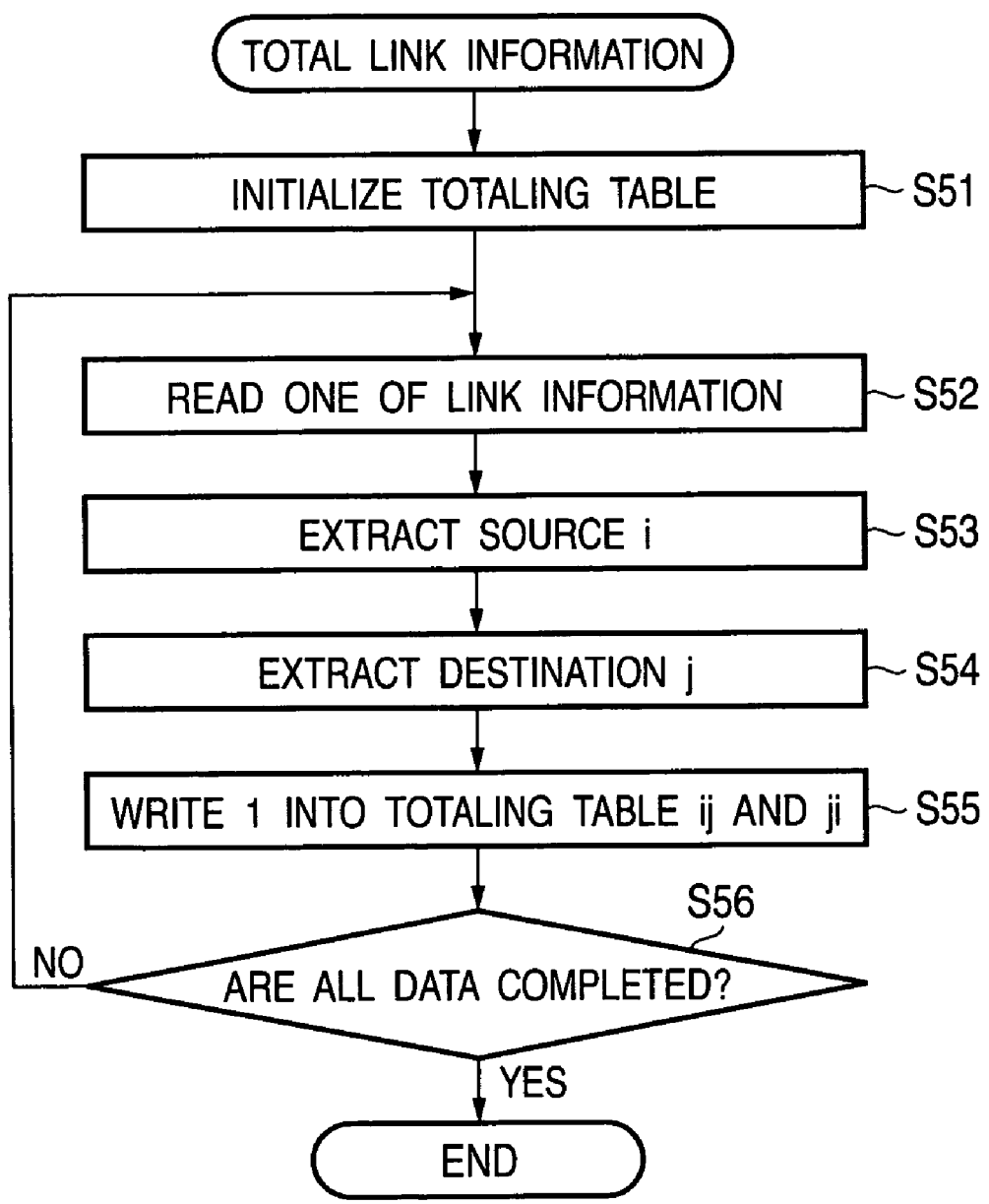
FIG. 11 is a flowchart showing a process which totals link information when the links do not have directionality and presence/absence of the links is compared.

FIG. 11 is a flowchart showing a process that totals the link information in such a case.

First, the link information totaling table (see FIG. 10) in which the row and the column are constructed for each node is initialized (Step S51).

Next, one of the link information is read from the communication log of the corresponding network (Step S52), the node ID (temporarily referred to as i) of the source is extracted (Step S53), and the node ID (temporarily referred to as j) of the destination is extracted (Step S54). Then, 1 is written into the corresponding columns of the link information totaling table, that is, i-th row and j-th column, and j-th row and i-th column, respectively (Step S55). Such a link information totaling process is repeatedly executed with respect to all link information of the communication log (Step S56).

If the totaling of the link information is completed, the similarity between the networks to be compared is calculated based on the totaling result. In this case, the degrees of accordance of the presence/absence of the links among all corresponding nodes in the networks to be compared are compared to one another. Then, the similarity s between the networks is calculated by dividing the sum of the comparison results by the number of the possible links.

The number of all nodes constituting the network V is n, the ID of the source node of the message is i (where $1 \leq i \leq n$), and the ID of the destination node thereof is j (where $1 \leq j \leq n$). Here, when the link exists between the nodes i and j, the variable $x_{ij}$ is set to 1. When the link does not exist, $x_{ij}$ is set to 0. Further, in this case, when a corresponding link $x_{ij}'$ of a network V' to be compared to the network V and the presence/absence of the link accord with each other, the degree of accordance is set to 1. When they do not accord with each other, the degree of accordance is set to 0. Then, the number of the possible links are determined based on the numbers of the nodes n included in the network V and the network V'. Subsequently, the sum of the comparison results of accordance and discordance in all nodes is divided by the number of the possible links. As a result, the degrees of accordance s of the presence/absence of the links among all nodes are quantitatively expressed.

The degree of accordance of the presence/absence of the link between the node i and the node j is expressed by $(1-|x_{ij}-x_{ij}'|)$. Further, the number of the possible links in the network V is expressed by a combination $_nC_2$ when the directionality of the link is not considered. Therefore, the degrees of accordance s of the presence/absence of the links in all nodes between the network V and the network V' can be determined by the following equation.

$$s = \frac{\sum_{i=1}^{n-1} \sum_{j=i+1}^{n} (1 - |x_{ij} - x_{ij}'|)}{_nC_2}$$ [Equation 7]

Figure 12:
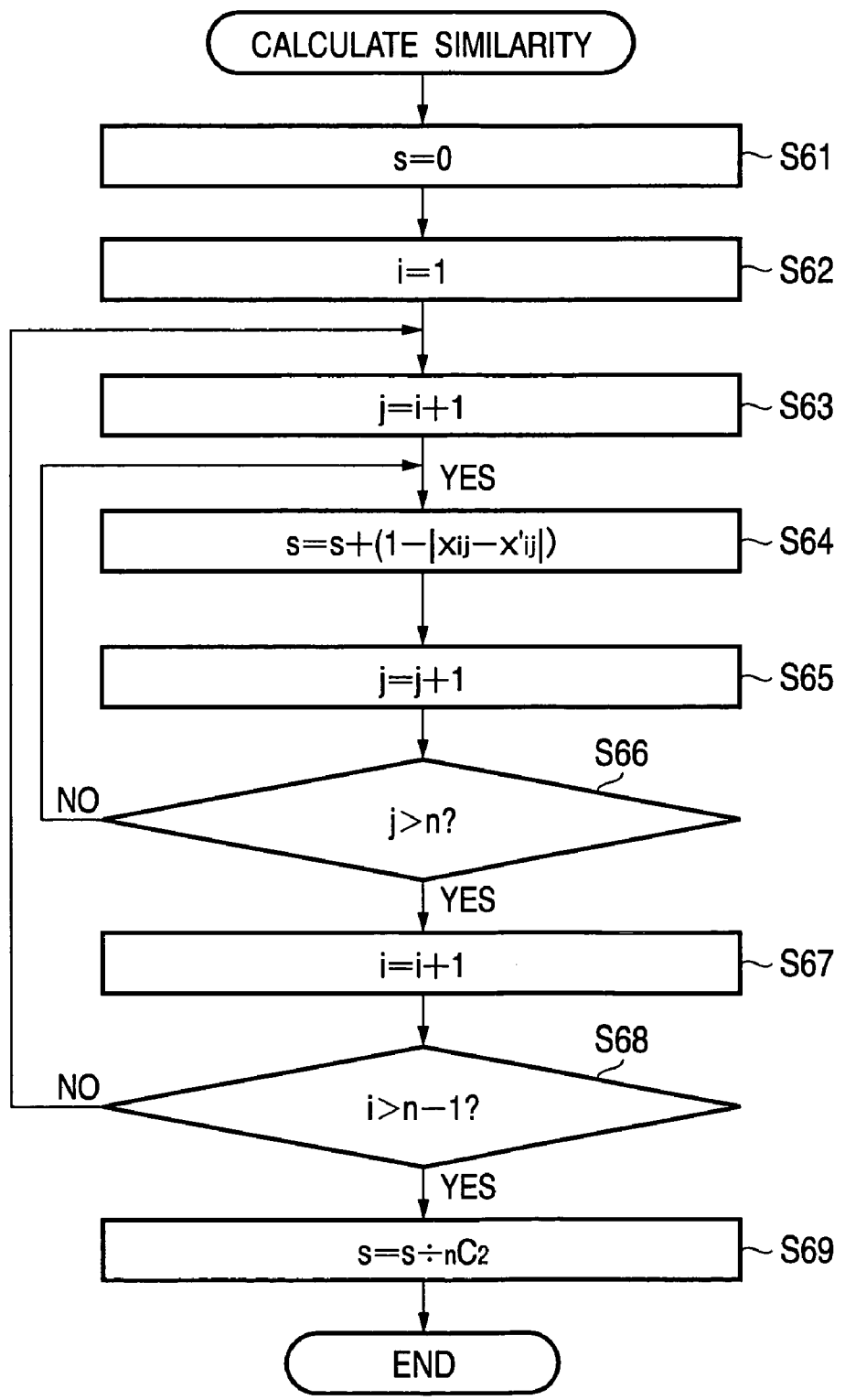
FIG. 12 is a flowchart showing a process which calculates the similarity among the networks when the links do not have directionality and the presence/absence of the links is compared.

FIG. 12 is a flowchart showing a process which calculates the similarity between the networks.

First, the similarity s and the variable i indicating the source node ID are initialized (Steps S61 and S62).

Then, in the network V and the network V' to be compared, the degree of accordance $(1-|x_{ij}-x_{ij}'|)$ of the presence/absence of the link between the node i and the node j is calculated and the sum of the comparison results among all nodes is calculated (Steps S63 to S68).

Then, by dividing the sum of the comparison results of accordance and discordance in all nodes by the number of the possible links $_nC_2$, the degrees of accordance s of the presence/absence of the links among all nodes are quantitatively expressed (Step S69).

Figure 13:
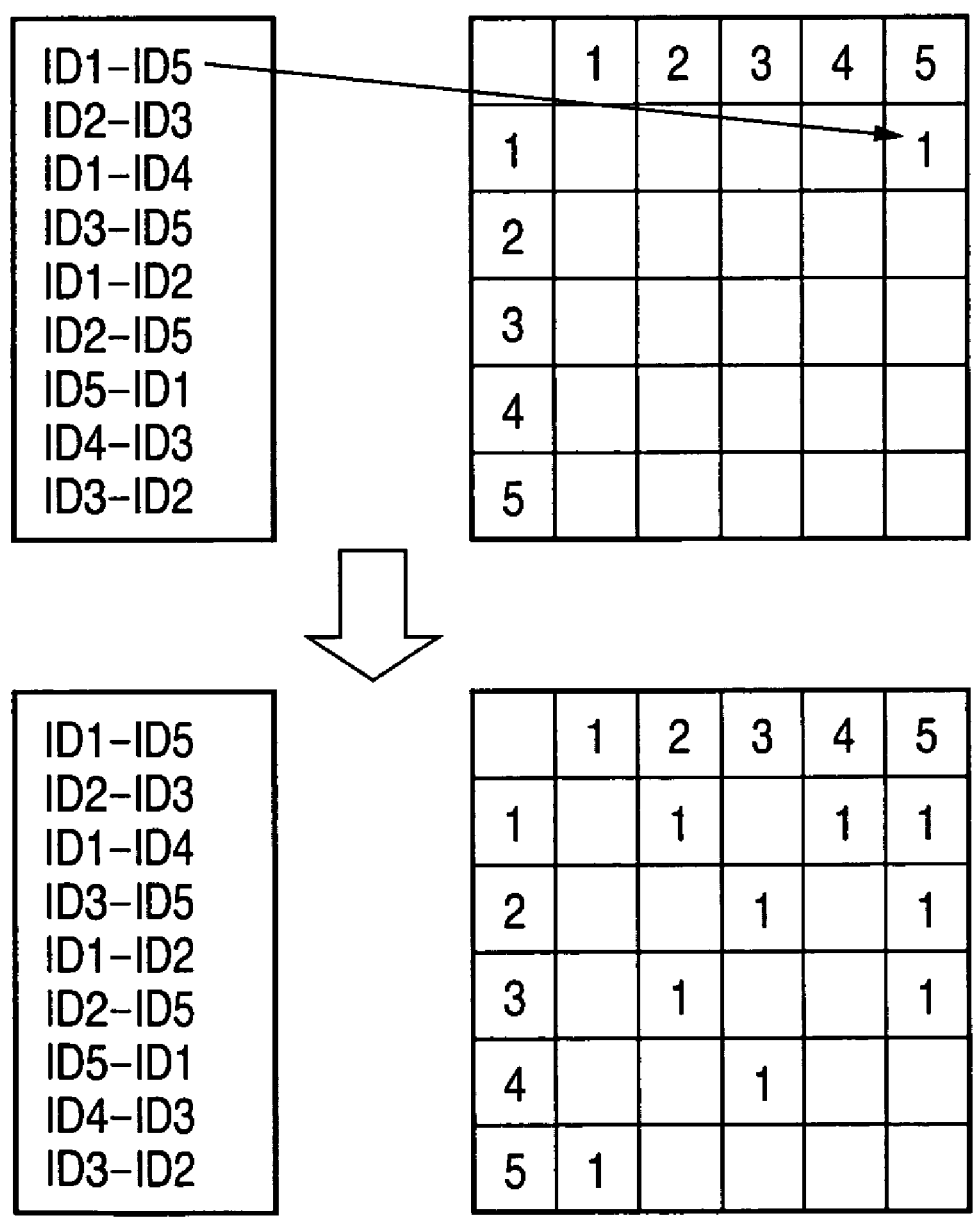
FIG. 13 is a diagram showing a case which totals link information when the links have directionality.

(2) When the Link has the Directionality and the Presence/Absence of the Links are Compared FIG. 13 shows a case which totals the link information when the link has the directionality. The link information is constructed by the communication log in the organization, for example. In this case, only the presence/absence of the links among the nodes is totaled and a source (Sender) and a destination (Receiver) of a message are divided. For example, with respect to the communication log of ID1-ID5, in a link information totaling table in which a row and a column are constructed for each node, 1 which indicates that the link exists is written into only ID1-ID5.

Figure 14:
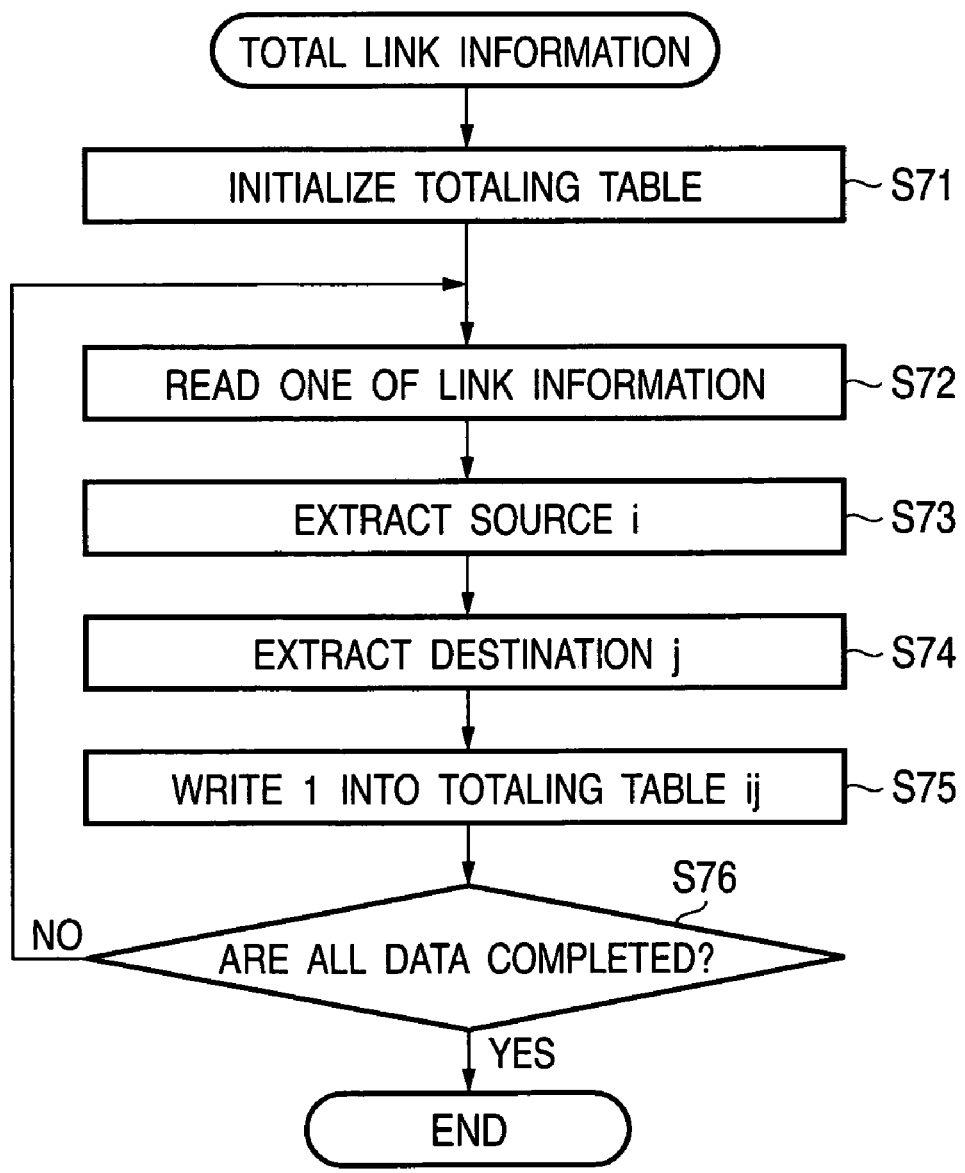
FIG. 14 is a flowchart showing a process which totals link information when the links have directionality and the presence/absence of the links is compared.

FIG. 14 is a flowchart showing a process that totals the link information in such a case.

First, the link information totaling table (see FIG. 13) in which the row and the column are constructed for each node is initialized (Step S71).

Next, one of the link information is read from the communication log of the corresponding network (Step S72), the node ID (temporarily referred to as i) of the source is extracted (Step S73), and the node ID (temporarily referred to as j) of the destination is extracted (Step S74). Then, 1 indicating that the link exists is written into the corresponding column of the link information totaling table, that is, i-th row and j-th column (Step S75). Such a link information totaling process is repeatedly executed with respect to all link information of the communication log (Step S76).

If the totaling of the link information is completed, the similarity between the networks to be compared is calculated based on the totaling result. In this case, the degrees of accordance of the presence/absence of the links among all corresponding nodes in the networks to be compared are compared to one another. Then, the similarity s between the networks is calculated by dividing the sum of the comparison results by the number of the possible links.

The number of all nodes constituting the network V is n, the ID of the source node of the message is i (where $1 \leq i \leq n$), and the ID of the destination node thereof is j (where $1 \leq j \leq n$). Here, when the link exists between the nodes i and j, the variable $x_{ij}$ is set to 1. When the link does not exist, $x_{ij}$ is set to 0. Further, in this case, when a corresponding link $x_{ij}'$ of a network V' to be compared to the network V and the presence/absence of the link accord with each other, the degree of accordance is set to 1. When they do not accord with each other, the degree of accordance is set to 0. Then, the number of the possible links are determined based on the numbers of the nodes n included in the network V and the network V'. Subsequently, the sum of the comparison results of accordance and discordance in all nodes is divided by the number of the possible links. As a result, the degrees of accordance s of the presence/absence of the links among all nodes are quantitatively expressed.

The degree of accordance of the presence/absence of the link between the node i and the node j is expressed by $(1-|x_{ij}-x_{ij}'|)$. Further, the number of the possible links in the network V is expressed by the permutation $_nP_2$ since the directionality of the link is considered. Therefore, the degrees of accordance s of the presence/absence of the links in all nodes between the network V and the network V' can be determined by the following equation.

$$s = \frac{\sum_{i=1}^{n}\sum_{j \neq i}(1-|x_{ij}-x_{ij}'|)}{_nP_2}$$ [Equation 8]

Figure 15:
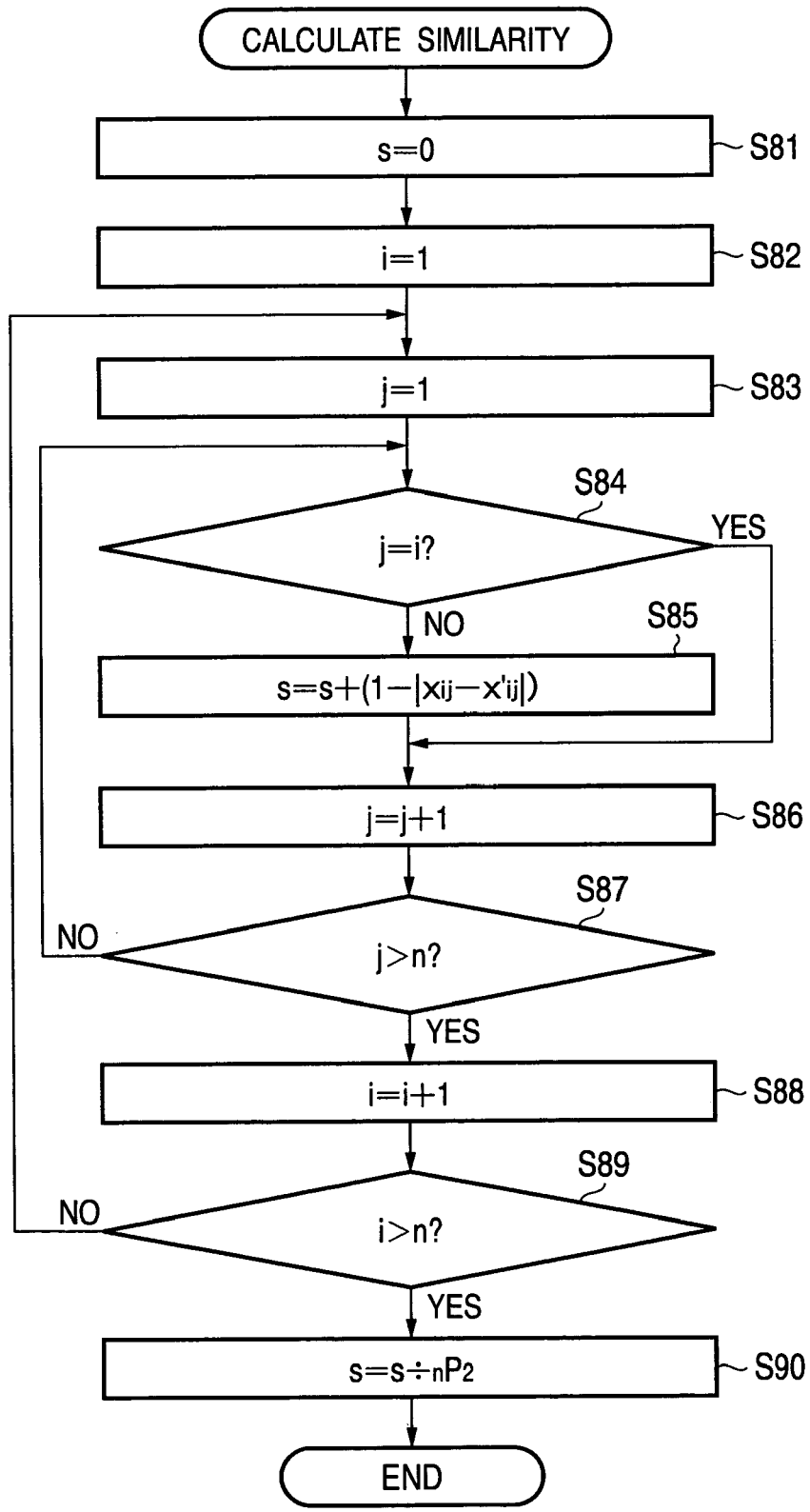
FIG. 15 is a flowchart showing a process which calculates the similarity among the networks when the links have directionality and the presence/absence of the links is compared.

FIG. 15 is a flowchart showing a process which calculates the similarity between the networks.

First, the similarity s and the variable i indicating the source node ID are initialized (Steps S81 and S82). In addition, the variable j indicating the destination node ID is initialized (Step S83).

Then, in the network V and the network V' to be compared, the degree of accordance $(1-|x_{ij}-x_{ij}'|)$ of the presence/absence of the link between the node i and the node j is calculated and the sum of the comparison results among all nodes is calculated (Steps S84 to S89).

Then, by dividing the sum of the comparison results of accordance and discordance in all nodes by the number of the possible links $_nP_2$, the degrees of accordance s of the presence/absence of the links among all nodes are quantitatively expressed (Step S90).

Figure 16:
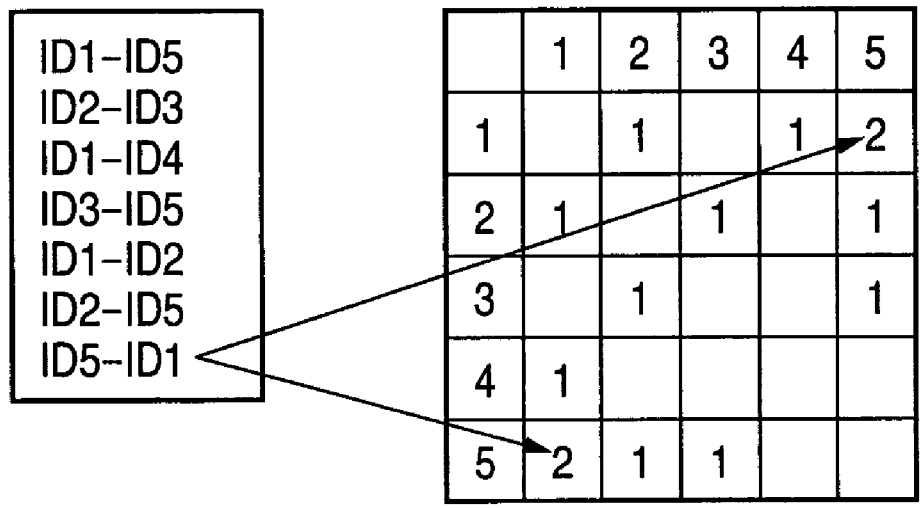
FIG. 16 is a diagram showing a case which totals link information when the links do not have directionality.

(3) When the Link does not have the Directionality and the Link Quantities are Compared FIG. 16 shows a case which totals the link information when the link does not have the directionality. The link information is constituted by the communication log in the organization, for example. In this case, only the presence/absence of the links among the nodes is totaled and a source (Sender) and a destination (Receiver) of a message are not divided. For example, with respect to the communication log of ID1-ID5, in a link information totaling table in which a row and a column are constructed for each node, 1 which indicates that the link exists is added to both ID1-ID5 and ID5-ID1. This is because, when the targets to be compared are valid links, the comparison is performed bi-directionally. If not necessary, only the addition may be performed one-directionally.

Figure 17:
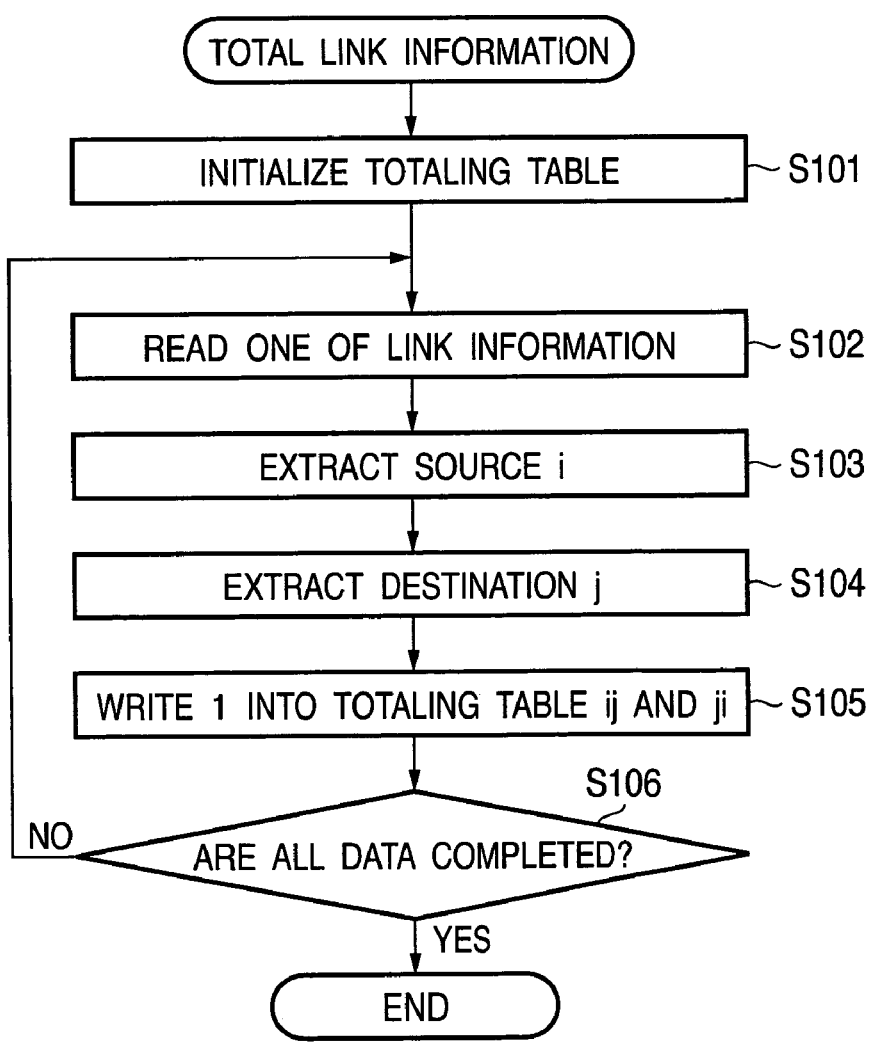
FIG. 17 is a flowchart showing a process which totals link information when the links do not have directionality and link quantities are compared to one another.

FIG. 17 is a flowchart showing a process that totals the link information in such a case.

First, the link information totaling table (see FIG. 16) in which the row and the column are constructed for each node is initialized (Step S101).

Next, one of the link information is read from the communication log of the corresponding network (Step S102), the node ID (temporarily referred to as i) of the source is extracted (Step S103), and the node ID (temporarily referred to as j) of the destination is extracted (Step S104). Then, 1 is added to the corresponding columns of the link information totaling table, that is, i-th row and j-th column, and j-th row and i-th column, respectively (Step S105). Such a link information totaling process is repeatedly executed with respect to all link information of the communication log (Step S106).

If the totaling of the link information is completed, the similarity between the networks to be compared is calculated based on the totaling result. In this case, the degrees of accordance of the presence/absence of the links among all corresponding nodes in the networks to be compared are compared to one another. Then, the similarity s between the networks is calculated by dividing the sum of the comparison results by the number of the possible links.

The number of all nodes constituting the network V is n, the ID of the source node of the message is i (where $1 \leq i \leq n$), and the ID of the destination node thereof is j (where $1 \leq j \leq n$). Here, the link quantity (for example, mail flow) between the nodes i and j is stored in the variable $v_{ij}$. Then, the value which is obtained by dividing the link quantity $v_{ij}$ by the maximum link quantity is set to the link rate $x_{ij}$ between the nodes i and j. Then, the number of the possible links are determined based on the numbers of the nodes n included in the network V and the network V'. Subsequently, the sum of the comparison results of the link rates in all nodes is divided by the number of the possible links. As a result, the degrees of accordance s of the link rates among all nodes are quantitatively expressed.

The degree of accordance of the link rate between the node i and the node j is expressed by $(1-|x_{ij}-x_{ij}'|)$. Further, the number of the possible links in the network V is expressed by the combination $_nC_2$ when the directionality of the link is not considered. Therefore, the degrees of accordance s of the presence/absence of the links in all nodes between the network V and the network V' can be determined by the following equation.

$$s = \frac{\sum_{i=1}^{n-1}\sum_{j=i+1}^{n}(1-|x_{ij}-x'_{ij}|)}{{}_nC_2}$$ [Equation 9]

When the link rate of each node is calculated and when the comparison of the link quantities between the network V and the network V' to be compared is required, the rates with respect to the maximum link quantity of both the network V and the network V' are taken. In this case, the link rates $x_{ij}$ and $x_{ij}'$ between the nodes i and j are expressed by the following equation.

$$x_{ij} = \frac{v_{ij}}{\max(v \in V, v' \in V')}$$ [Equation 10]

$$x'_{ij} = \frac{v'_{ij}}{\max(v \in V, v' \in V')}$$

Further, when the relative rates of the link quantities in the network V and the network V' are required, the rates with respect to the maximum link quantities in the network V and the network V' are respectively taken. In this case, the link rates $x_{ij}$ and $x_{ij}'$ between the nodes i and j are expressed by the following equation.

$$x_{ij} = \frac{v_{ij}}{\max(v \in V)}$$ [Equation 11]

$$x'_{ij} = \frac{v'_{ij}}{\max(v' \in V')}$$

Figure 18:
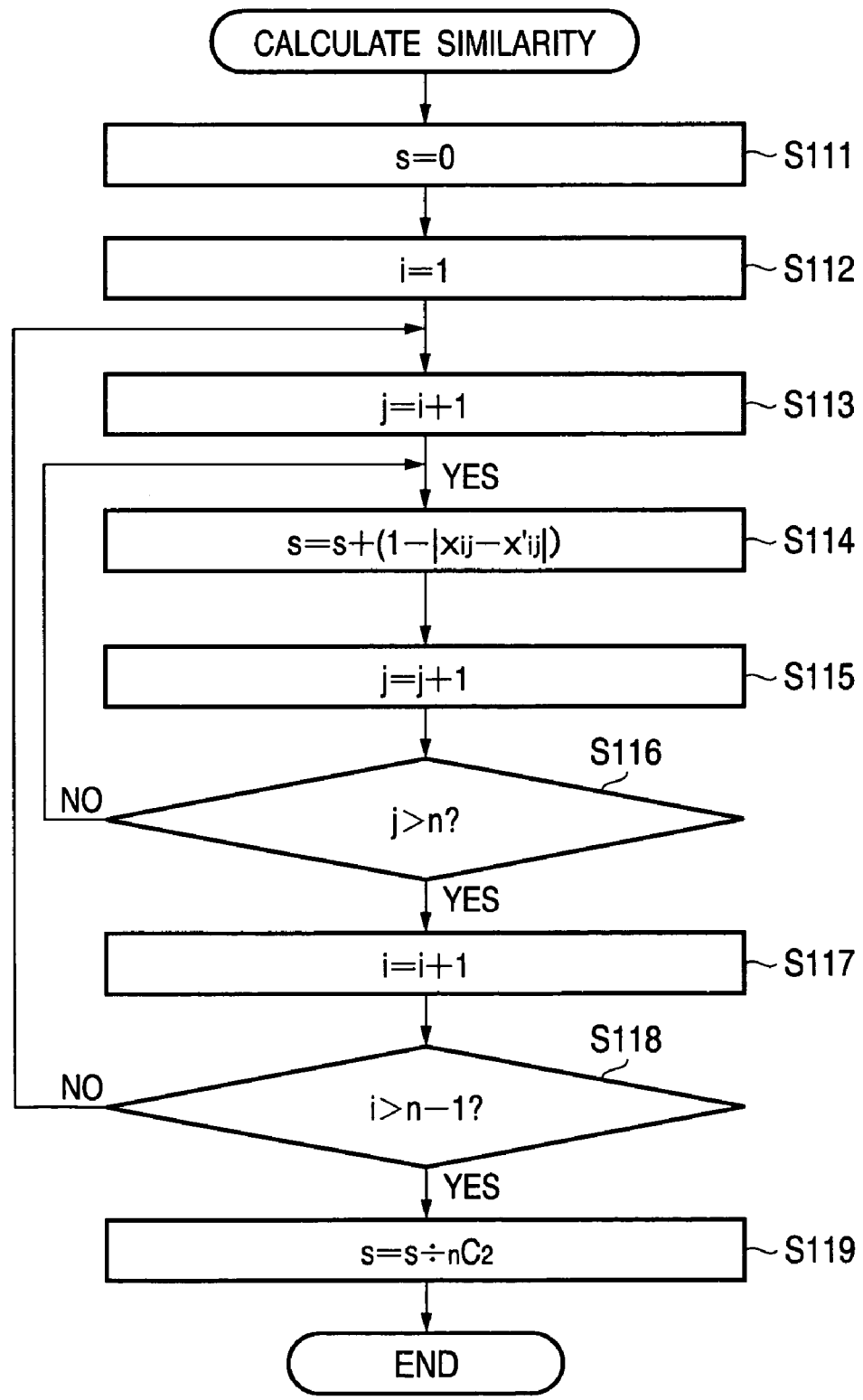
FIG. 18 is a flowchart showing a process which calculates the similarity among the networks when the links do not have directionality and the link quantities are compared to one another.

FIG. 18 is a flowchart showing a process which calculates the similarity between the networks.

First, the similarity s and the variable i indicating the source node ID are initialized (Steps S111 and S112).

Then, in the network V and the network V' to be compared, the degree of accordance $(1-|x_{ij}-x_{ij}'|)$ of the link rate between the node i and the node j is calculated and the sum of the comparison results among all nodes is calculated (Steps S113 to S118).

Then, by dividing the sum of the comparison results of accordance and discordance in all nodes by the number of the possible links ${}_nC_2$, the degrees of accordance s of the presence/absence of the links among all nodes are quantitatively expressed (Step S119).

(4) When the Link has the Directionality and the Link Quantities are Compared

FIG. 19 shows a case which totals the link information when the link has the directionality. The link information is constructed by the communication log in the organization, for example. In this case, only the presence/absence of the links among the nodes is totaled and a source (Sender) and a destination (Receiver) of a message are divided. For example, with respect to the communication log of ID1-ID5, in a link information totaling table in which a row and a column are constructed for each node, 1 which indicates that the link exists is added to only ID1-ID5.

Figure 20:
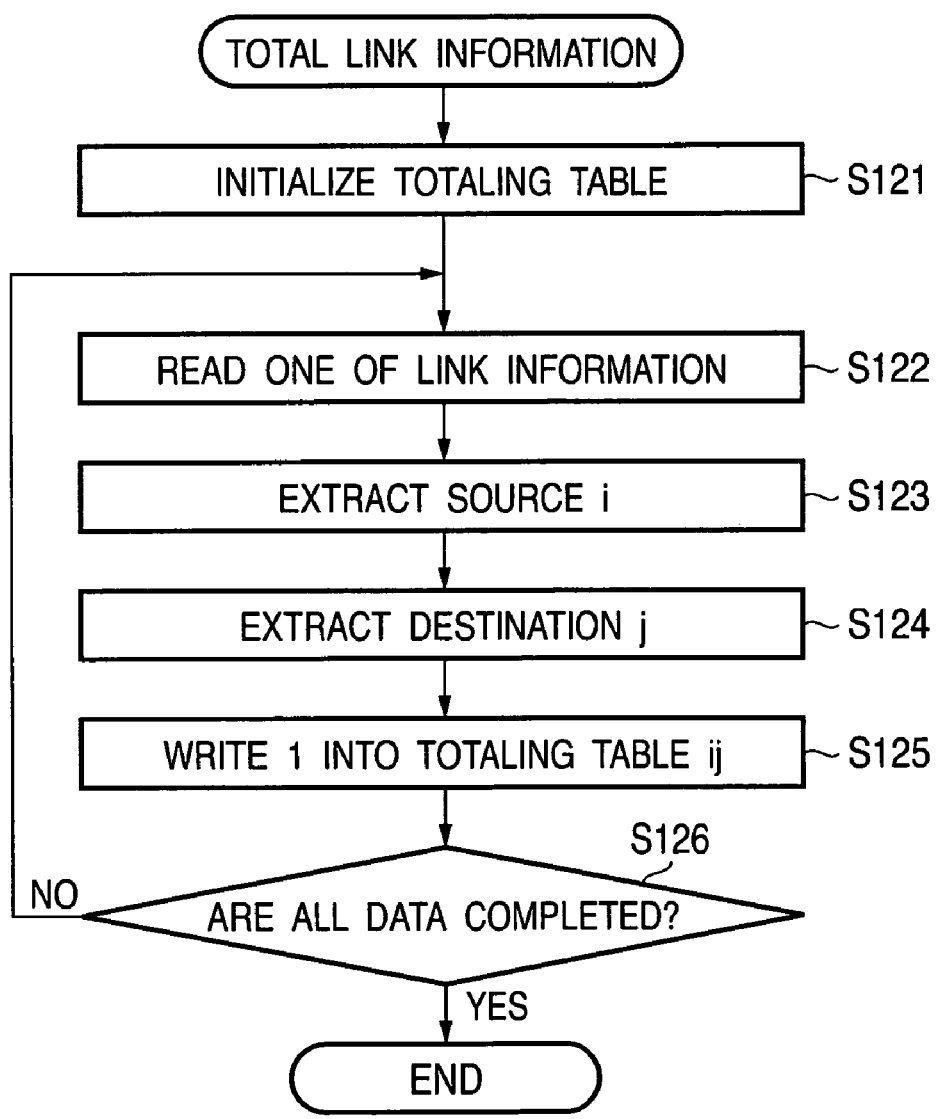
FIG. 20 is a flowchart showing a process which totals link information when the links do not have directionality and the link quantities are compared to one another.

FIG. 20 is a flowchart showing a process that totals the link information in such a case.

First, the link information totaling table (see FIG. 19) in which the row and the column are constructed for each node is initialized (Step S121).

Next, one of the link information is read from the communication log of the corresponding network (Step S122), the node ID (temporarily referred to as i) of the source is extracted (Step S123), and the node ID (temporarily referred to as j) of the destination is extracted (Step S124). Then, 1 indicating that the link exists is added to the corresponding column of the link information totaling table, that is, i-th row and j-th column (Step S125). Such a link information totaling process is repeatedly executed with respect to all link information of the communication log (Step S126).

If the totaling of the link information is completed, the similarity between the networks to be compared is calculated based on the totaling result. In this case, the degrees of accordance of the link quantities among all corresponding nodes in the networks to be compared are compared to one another. Then, the similarity s between the networks is calculated by dividing the sum of the comparison results by the number of the possible links.

The number of all nodes constituting the network V is n, the ID of the source node of the message is i (where $1 \leq i \leq n$), and the ID of the destination node thereof is j (where $1 \leq j \leq n$). Here, the link quantity (for example, mail flow) between the nodes i and j is stored in the variable $v_{ij}$. Then, the value which is obtained by dividing the link quantity $v_{ij}$ by the maximum link quantity is set to the link rate $x_{ij}$ between the nodes i and j. Then, the number of the possible links are determined based on the numbers of the nodes n included in the network V and the network V'. Subsequently, the sum of the comparison results of the link rates in all nodes is divided by the number of the possible links. As a result, the degrees of accordance s of the link rates among all nodes are quantitatively expressed.

The degree of accordance of the link rate between the node i and the node j is expressed by $(1-|x_{ij}-x_{ij}'|)$ Further, the number of the possible links in the network V is expressed by the permutation ${}_nP_2$ when the directionality of the link is considered. Therefore, the degrees of accordance s of the presence/absence of the links in all nodes between the network V and the network V' can be determined by the following equation.

$$s = \frac{\sum_{i=1}^{n}\sum_{j \neq i}(1-|x_{ij}-x'_{ij}|)}{{}_nP_2}$$ [Equation 12]

When the link rate of each node is calculated and when the comparison of the link quantities between the network V and the network V' to be compared is required, the rates with respect to the maximum link quantity of both the network V and the network V' are taken. Further, when the relative rates of the link quantities in the network V and the network V' are required, the rates with respect to the maximum link quantities in the network V and the network V' are respectively taken (the same relation).

Figure 21:
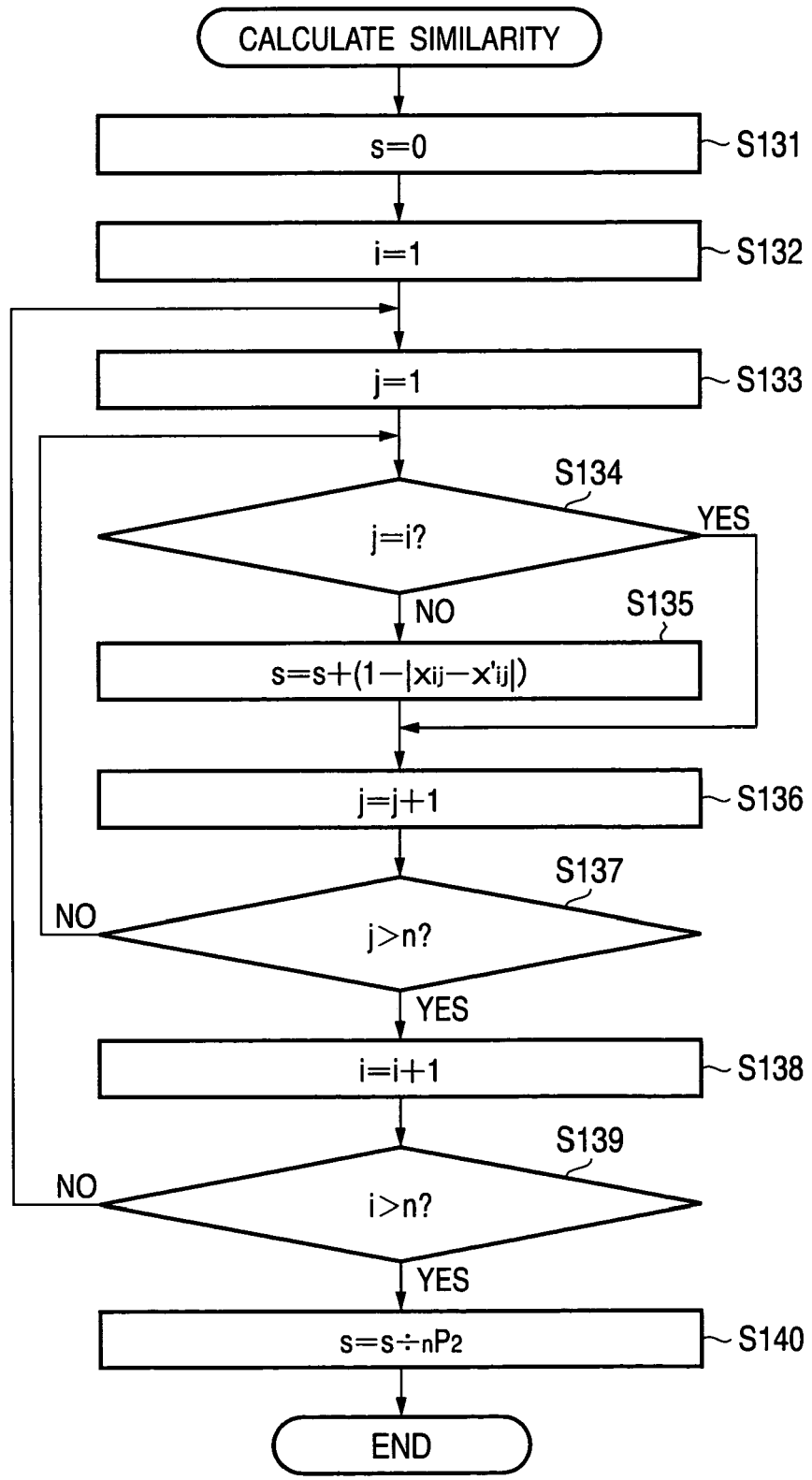
FIG. 21 is a flowchart showing a process which calculates the similarity among the networks when the links have directionality and the link quantities are compared to one another.

FIG. 21 is a flowchart showing a process which calculates the similarity between the networks.

First, the similarity s and the variable i indicating the source node ID are initialized (Steps S131 and S132). In addition, the variable j indicating the destination node ID is initialized (Step S133).

Then, in the network V and the network V' to be compared, the degree of accordance $(1-|x_{ij}-x_{ij}'|)$ of the link rate between the node i and the node j is calculated and the sum of the comparison results among all nodes is calculated (Steps S134 to S139).

Then, by dividing the sum of the comparison results of accordance and discordance in all nodes by the number of the possible links $_nP_2$, the degrees of accordance s of the presence/absence of the links among all nodes are quantitatively expressed (Step S140).

(5) An Example in Which the Recognition of Relevance is Compared to an Actual Communication in the Group Sharing Link Network By examining at least one of a preprocess and a subsequent process through a questionnaire in a value chain of an organization or a community, the recognition status of a value information chain structure is inferred based on a personal position and the questionnaire result. Then, the analysis results in the inquiry, such as the questionnaire or the like, and a log of actual transmission information data are compared to each other, and a gap between the recognition and an actual performance is examined. The statuses between the organizations can be diagnosed by the difference between the recognition (or expectation) of the value chain structure through the inquiry and the actual performance of the value chain structure through log data (for example, see Japanese Patent Application No. 2004-240081 which is already assigned to the same assignee as that of the present application).

Here, the group sharing link network in which five persons of ID1 to ID5 serve as the fixed nodes is exemplified. Further, the comparison of the recognition of relevance among the nodes to the actual communication is performed.

Figure 22:
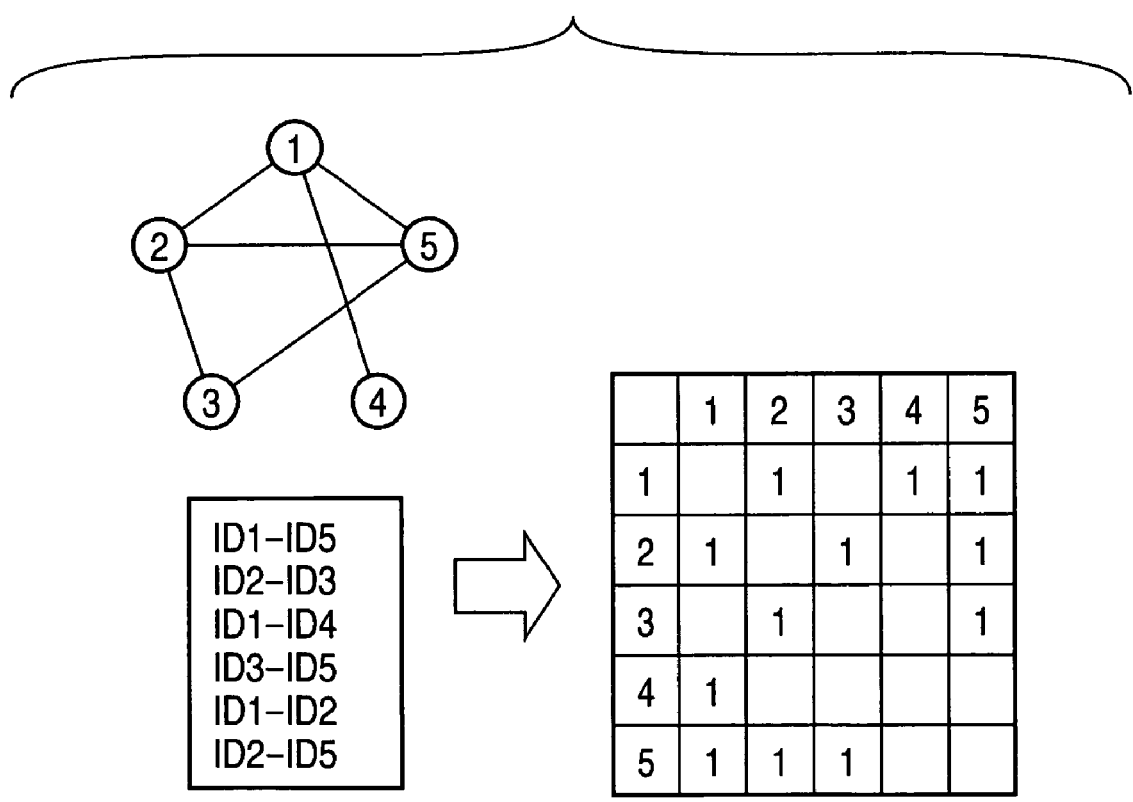
FIG. 22 is a diagram showing a case in which a search result of contacts from members through a questionnaire or hearing is mapped to a link information totaling table as link information.

First, a relevant contact is searched from the members serving as the respective nodes through a questionnaire or a hearing and the search result is mapped to the link information totaling table as the link information. FIG. 22 shows the mapping result to the link information totaling table.

Figure 23:
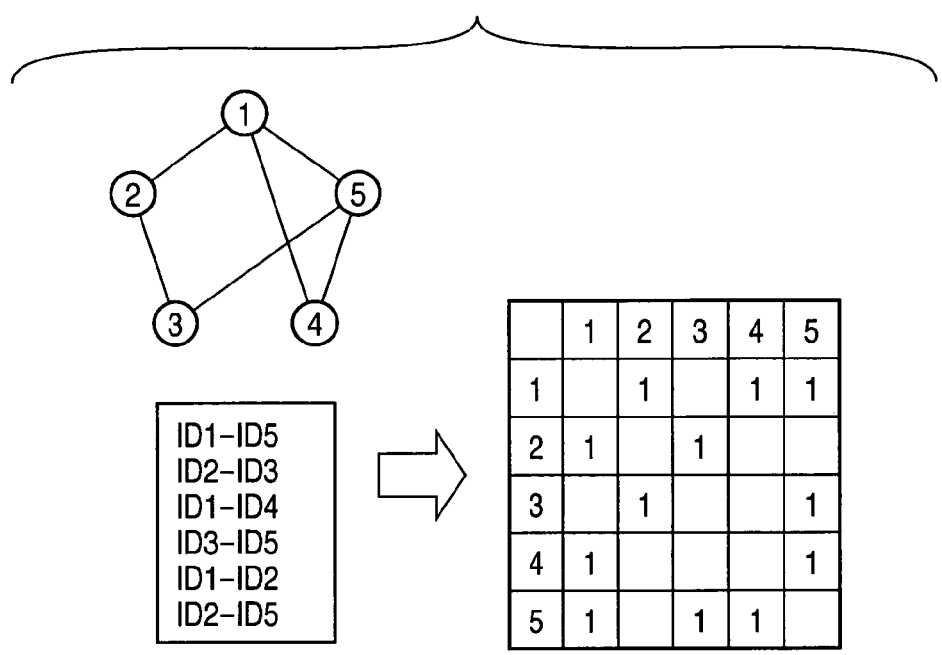
FIG. 23 is a diagram showing a case in which a communication log, such as a communication history of a mail server, is analyzed, the presence/absence of communications among the nodes is detected as the presence/absence of the links, and the detection result is mapped to the link information totaling table as link information.

Next, the communication log, such as a communication history of a mail server or the like, is analyzed, the presence/absence of the communications among the nodes is detected as the presence/absence of the links, and the detection result is mapped to the link information totaling table as the link information. FIG. 23 shows the mapping result to the link information totaling table.

Then, the similarity between the group sharing link networks, as shown in FIGS. 22 and 23, is calculated through the process shown in FIG. 12, for example. In the example of FIG. 22 or 23, the similarity of 0.8 is obtained. That is, it is judged that there is the gap of about 20% between the recognition of relevance and the actual communication among the members in the organization.

(6) An Example in Which the Communications of One Month and Another Month are Compared to Each Other Next, an example in which a change in communication for every month is calculated in the group sharing link network will be described. However, it is assumed that the dummy nodes are added with the increase or decrease in the number of the nodes due to the personnel change, the entering a company, and the retirement from a company.

Figure 24:
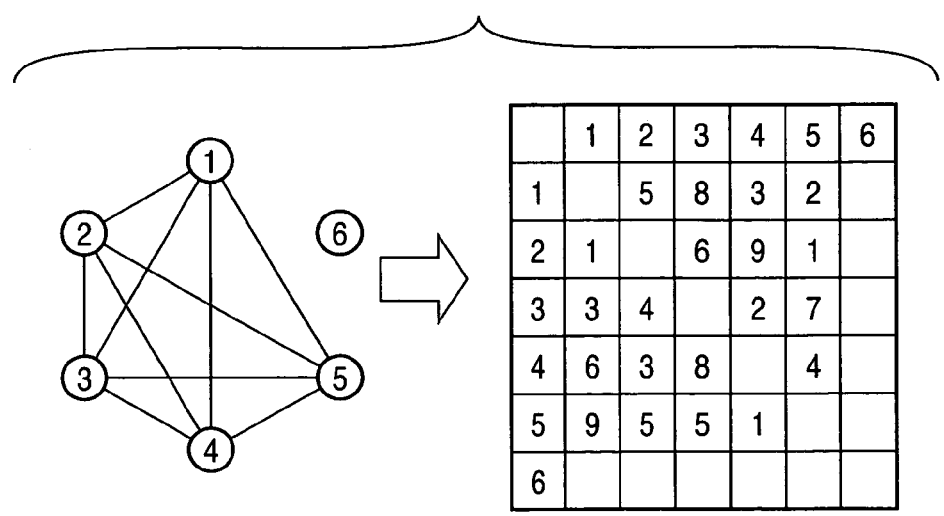
FIG. 24 is a diagram showing a case in which a pattern of communication of k month is mapped to a link information history table as a group sharing link network.

FIG. 24 shows a communication pattern of k month. In FIG. 24, the links among the nodes in the group sharing link network indicate that the communications are made on this month. Further, since m month and members to be compared are different, a node 6 not having the links with other nodes is added as the dummy. Then, the link quantities among the nodes are totaled, such that the link information totaling table shown in FIG. 24 on the right side can be obtained.

Figure 25:
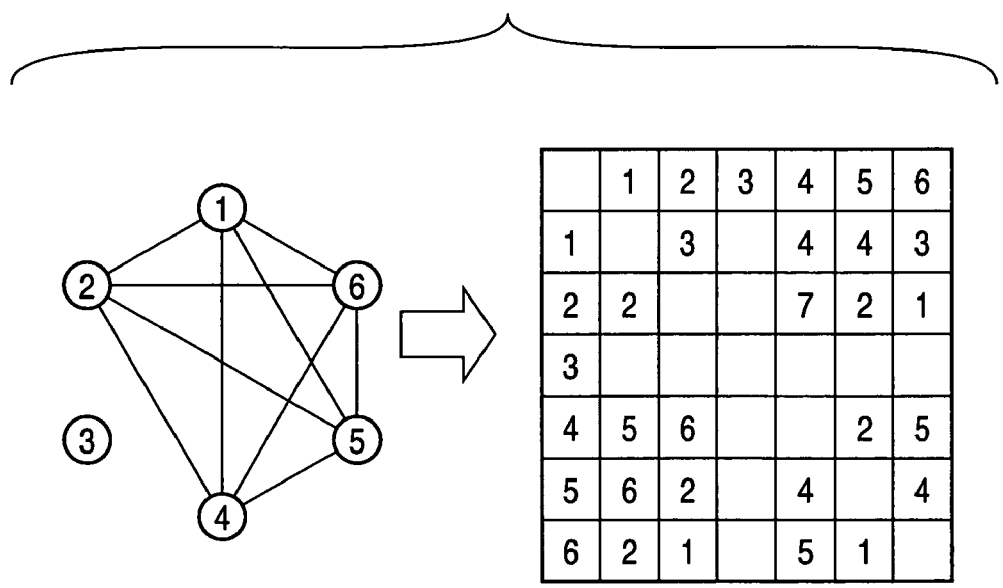
FIG. 25 is a diagram showing a case in which a pattern of communication of m month is mapped to the link information history table as the group sharing link network.
Figure 26:
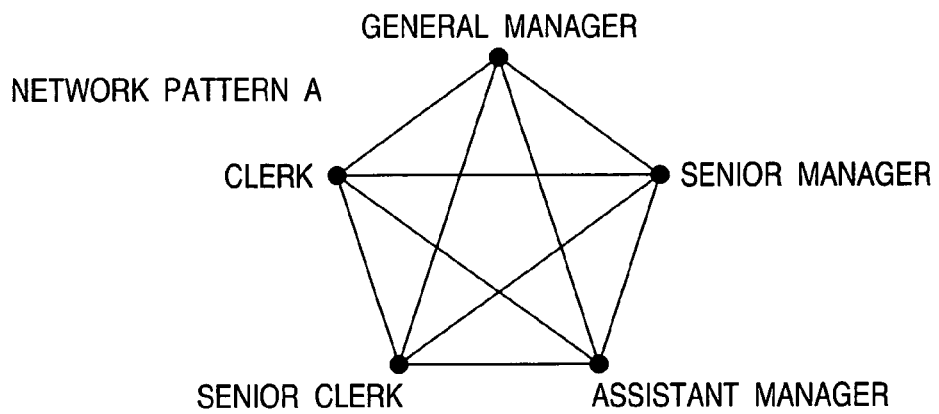
FIG. 26 is a diagram illustrating a network structure which cannot be expressed only with a tree structure.
Figure 26:
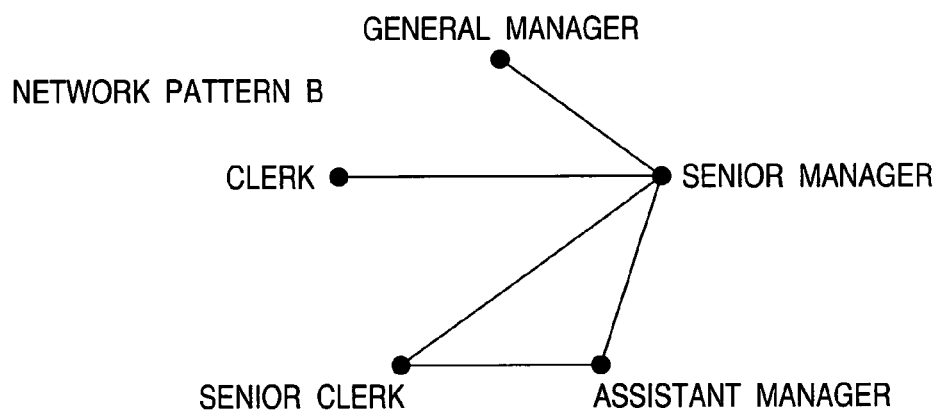
Figure 26:
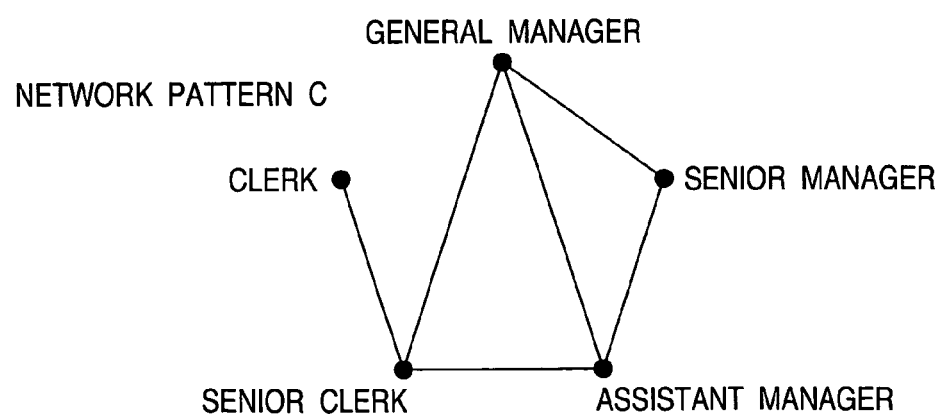

Further, FIG. 25 shows a communication pattern of m month. In FIG. 25, the links among the nodes in the group sharing link network indicate that the communications are made on this month. Further, since k month and members to be compared are different, a node 3 not having the links with other nodes is added as the dummy. Then, the link quantities among the nodes are totaled, such that the link information totaling table shown in FIG. 25 on the right side can be obtained.

Then, the similarity between the group sharing link networks shown in FIGS. 24 and 25 is calculated through the process shown in FIG. 18, for example. In the example of FIG. 24 or 25, the similarity between the networks of 0.67037 is obtained as the comparison results of the link quantities. Further, as the comparison results of the link rates, the similarity between the networks of 0.64709 is obtained.

As such, when the nodes increase or decrease as time passes, that is, when some nodes of the group sharing link network change, by adding the dummy nodes, the similarity between the networks can be calculated.

As regards two types of the similarity, when it is considered that the link quantity is not changed by so much due to the time lapse changes of the logs equal to each other or the like, it is preferable to quantitatively compare the networks to one another. On the contrary, when the recognition and the log having difference measures are compared to each other, it is preferable to compare by using the link rates.

As described above, the invention has been described in detail with reference to the specified embodiment. However, it is apparent that various modifications or alternatives can be made by an ordinary skilled person within the scope without departing from the spirit of the invention.

According to the invention, among structures, each having the network structure in which the correspondence relationship is clear, the presence/absence of the links (the degree of coupling between the nodes), the comparison of the absolute quantities of the links, and the comparison of the relative quantities of the links can be quantitatively performed.

In the present specification, the embodiment of the invention has been described by way of the example in which the group sharing link networks are primarily compared. However, in addition to the comparison between the group sharing link networks, the invention can be applied to a comparison of time lapse changes in traffics in the communication networks (for example, a comparison of kinds of traffics, such as TCP, UDP, and the like), a comparison of traffics through kinds of automobiles (for example, a quantitative comparison of measurement results for categories, such as a large-size automobile, a regular-size automobile, and the like, in a traffic flow), or the like.

Further, when the comparison of the networks according to the invention is performed with communications, such as mails, as targets, the text is grouped by a method, such as content analysis, or the like, such that the comparison among the groups can be performed.

Further, in the embodiment described in the present specification in detail, the network structure not having the links to the same node is handled. However, it is needless to say that, by defining a link serving as a node where the start point and end point are the same and by counting the number of links or a flow at a diagonal location in the link information totaling table, similarly, the comparison between the network structures can be performed.

As mentioned above, according to an aspect of the invention, there is provided an information processing system which processes similarity among networks, each having fixed nodes and links connecting the nodes. The information processing system includes a link information input unit which inputs link information indicating the links among the nodes in the respective networks to be compared, a link information totaling unit which totals the link information in the respective networks to be compared and determines presence/ absence of the links among the nodes or link quantities, and a network similarity calculating unit which, among the respective networks to be compared, calculates the similarity among the networks based on the sum of the comparison results of the links among all nodes.

The interrelationship of all works required for accomplishing any project is schematized in a form of a so-called 'network'. The network described herein includes a communication network, a traffic flow, a group sharing link network, or the like. The network has a plurality of nodes and links connecting associated nodes. The link represents the degree of coupling between the nodes. For example, the link corresponds to presence/absence of a relationship of the nodes, a frequency or the number of times having the relationship (for example, a frequency or the number of times of mail transmission and reception).

When activity conditions of an organization and the like are evaluated, it is necessary to compare and analyze a network structure of the organization. According to the aspect of the invention, under a condition that the nodes are fixed, the degrees of accordance among the networks are defined as the similarity, and thus an approximation of the network structure can be determined. Specifically, in the network having the fixed nodes, a time lapse change can be expressed based on the similarity among the networks before and after in a time manner. Further, in the network having the fixed nodes, a difference among the links can be expressed based on the similarity among the networks. For example, in a case of the group sharing link network, the difference among the links is a difference among at least two of human recognition, a communication log, such as mail, and a behavior log.

That is, in accordance with the aspect of the invention, among structures, each having the network structure in which the correspondence relationship of the nodes is clear, the presence/absence of the links (the degree of coupling between the nodes), the comparison of the absolute quantities of the links, and the comparison of the relative quantities of the links can be quantitatively performed.

Here, the link information totaling unit may total the presence/absence of the links among the nodes in the respective networks to be compared. In this case, the network similarity calculating unit may compare the degrees of accordance of the presence/absence of the links among all corresponding nodes in the networks to be compared to one another and may calculate the similarity of the networks based on the sum of the comparison results.

Alternatively, the link information totaling unit may total the link quantities among the nodes in the respective networks to be compared. In this case, the network similarity calculating unit may compare the degrees of accordance of the link quantity among all corresponding nodes in the networks to be compared to one another and may calculate the similarity among the networks based on the sum of the comparison results.

Further, the information processing system may further include a link rate calculating unit which converts the link quantities among the nodes into link rates with respect to a maximum value. That is, the link quantities among the nodes are converted into the rates with respect to the maximum value, such that the measure of the similarity among the networks is uniform, irregardless of the link flow in the entire network. In this case, the network similarity calculating unit may compare the degrees of accordance of the link rates among all corresponding nodes in the networks to be compared to one another and may calculate the similarity of the networks based on the sum of the comparison results.

Here, the link rate calculating unit may takes, as the link rates, the rates of both networks to be compared with respect to the maximum link quantity. When the comparison of the link quantities among the networks to be compared is required, the rates of both networks to be compared with respect to the maximum link quantity are taken. In this case, by comparing the link quantities to one another through flow rates among the network structures, the similarity among networks can be calculated.

Alternatively, the link rate calculating unit may take, as the link rates, the rates with respect to the maximum link quantities in the respective networks respectively. When relative rates of the link quantities in a network V and a network V' are required, the rates with respect to the maximum link quantity in the networks V and V' are respectively taken. In this case, by comparing the link quantities through the relative rates in the respective networks, the similarity among the networks can be calculated.

Further, the information processing system may further include a dummy node adding unit which, when the nodes of the respective networks are increased or decreased, adds dummy nodes, which does not have links to other nodes, to one network having a small number of nodes from the networks to be compared and forms a correspondence relationship of the nodes among the networks to be compared. By adding the dummies of the deficient nodes to the respective networks such that the nodes are made to be equal, the correspondence relationship of the nodes among the networks can be secured.

Further, the network similarity calculating unit may calculate the similarity among the networks based on a value which is obtained by dividing the sum of the comparison results of the links among all nodes by the number of possible links in the networks to be compared.

For example, when the links among the nodes do not have directionality, the network similarity calculating unit calculates the number of the possible links based on a combination of the number of the nodes. Further, when the links among the nodes have directionality, the network similarity calculating unit may calculate the number of the possible links based on the permutation of the number of the nodes.

Further, according to another aspect of the invention, there is provided a computer program which is described in a computer readable format and which causes a computer system to execute a process of calculating similarity among networks, each having fixed nodes and links connecting the nodes, the process including, a link information input step of inputting link information indicating the links among the nodes in the respective networks to be compared, a link information totaling step of totaling the link information in the respective networks to be compared and determining presence/absence of the links among the nodes or link quantities, and a network similarity calculating step of, among the respective networks to be compared, calculating the similarity among the networks based on the sum of the comparison results of the links among all nodes.

According to the aspect, the computer program is to define a computer program which is described in the computer readable format and which causes the computer system to execute a predetermined process. That is, by installing the computer program according on the computer system, a cooperative action is exhibited on the computer system. As a result, the same advantages as those in the information processing system according to the aspect of the invention can be obtained.

According to the aspects of the invention, it is possible to provide the superior information processing system that can properly evaluate the network having the fixed nodes, such as the communication network, the traffic flow, the group sharing link network, or the like, which changes in the time manner or by any operation, the information processing method, and the computer program.

According to the aspects of the invention, it is possible to provide the superior information processing system that can defining the degrees of accordance among the networks, under the condition that the nodes are fixed, and determine the approximation of the network structure accordingly, the information processing method, and the computer program.

According to the aspects of the invention, among structures, each having the network structure in which the correspondence relationship is clear, the presence/absence of the links (the degree of coupling between the nodes), the comparison of the absolute quantities of the links, and the comparison of the relative quantities of the links can be quantitatively performed.

According to the aspects of the invention, the time lapse change of the group sharing link network or the time lapse change of the network flow can be quantitatively examined, or the measurement results from other viewpoints of log and recognition can be quantitatively compared to one another. Alternatively, the measurement results for categories, such as a large-scale automobile, a regular-size automobile, and the like, in the traffic flow are compared to one another.

In summary, the invention is disclosed by way of the embodiment, but the embodiment is not intended to limit the invention. Therefore, the subject matter of the invention should be defined by the claims appended hereto.

What is claimed is:

1. An information processing system comprising:
a link information input unit that inputs link information indicating links among nodes in networks;
a link information totaling unit that totals the link information in each network to be compared and determines presence/absence of the links among the nodes or link quantities;
a network similarity calculating unit which, among the networks to be compared, calculates a similarity among the networks based on a sum of a comparison result of the links among all nodes;
a link rate calculating unit that converts the link quantities among the nodes into link rates with respect to a maximum link quantity,
wherein the link information totaling unit totals the link quantities among the nodes in each network to be compared;
wherein the network similarity calculating unit compares degrees of accordance of the link quantities among all corresponding nodes in the networks to one another and calculates the similarity among the networks based on the sum of the comparison results; and
wherein the network similarity calculating unit compares the degrees of accordance of the link rates among all corresponding nodes in the networks to be compared to one another and calculates the similarity of the networks based on the sum of the comparison results.

2. The information processing system according to claim 1, wherein the link rate calculating unit takes, as the link rates, the rates of both networks with respect to the maximum link quantity.

3. The information processing system according to claim 1, wherein the link rate calculating unit takes, as the link rates, the rates with respect to the maximum link quantity in each of the networks.

4. An information processing system comprising:
a link information input unit that inputs link information indicating links among nodes in networks;
a link information totaling unit that totals the link information in each network to be compared and determines presence/absence of the links among the nodes or link quantities; and
a network similarity calculating unit which, among the networks to be compared, calculates a similarity among the networks based on a sum of a comparison result of the links among all nodes,
wherein the network similarity calculating unit calculates the similarity among the networks based on a value which is obtained by dividing the sum of the comparison results of the links among all nodes by the number of possible links in the networks to be compared.

5. The information processing system according to claim 4, wherein, when the links among the nodes do not have directionality, the network similarity calculating unit calculates the number of the possible links based on a combination of the number of the nodes.

6. The information processing system according to claim 4, wherein, when the links among the nodes have directionality, the network similarity calculating unit calculates the number of the possible links based on a permutation of the number of the nodes.

7. An information processing method comprising:
inputting link information indicating links among nodes in networks;
totaling the link information in each network to be compared and determining presence/absence of the links among the nodes or link quantities;
calculating a similarity among the networks based on a sum of a comparison result of the links among all nodes with respect to the networks;
wherein the link quantities among the nodes in the networks are totaled, and
wherein degrees of accordance of the link quantities among all corresponding nodes in the networks are compared to one another and the similarity among the networks is calculated based on the sum of the comparison results when the similarity is calculated; and
converting the link quantities among the nodes into link rates with respect to a maximum link quantity, wherein the degrees of accordance of the link rates among all corresponding nodes in the networks are compared to one other and the similarity of the networks is calculated based on the sum of the comparison results.

8. The information processing method according to claim 7, wherein rates of both networks to be compared with respect to the maximum link quantity is taken as the link rates, when the link quantities among the nodes are converted in the link rates.

9. The information processing method according to claim 7, wherein rates with respect to the maximum link quantity in each of the networks are respectively taken as the link rates, when the link quantities among the nodes are converted in the link rates.

10. An information processing method comprising:
inputting link information indicating links among nodes in networks;
totaling the link information in each network to be compared and determining presence/absence of the links among the nodes or link quantities; and
calculating a similarity among the networks based on a sum of a comparison result of the links among all nodes with respect to the networks, wherein the similarity among the networks is calculated based on a value which is obtained by dividing the sum of the comparison results of the links among all nodes by the number of possible links in the networks to be compared, when the similarity among the networks is calculated.

11. The information processing method according to claim 10, wherein the number of the possible links is calculated based on a combination of the number of the nodes in case that the links among the nodes do not have directionality, when the similarity among the networks is calculated.

12. The information processing method according to claim 10, wherein the number of the possible links is calculated based on a permutation of the number of the nodes in case that the links among the nodes have directionality, when the similarity among the networks is calculated.

* * * * *